(12) United States Patent
Sugiura et al.

(10) Patent No.: US 9,475,369 B2
(45) Date of Patent: Oct. 25, 2016

(54) VEHICLE DOOR OPENING AND CLOSING APPARATUS AND METHOD OF CONTROLLING THE SAME

(71) Applicant: AISIN SEIKI KABUSHIKI KAISHA, Kariya-shi (JP)

(72) Inventors: Takehiko Sugiura, Kariya (JP); Hiroshi Kiriyama, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 19 days.

(21) Appl. No.: 14/329,148

(22) Filed: Jul. 11, 2014

(65) Prior Publication Data

US 2015/0025751 A1    Jan. 22, 2015

(30) Foreign Application Priority Data

Jul. 17, 2013  (JP) ................. 2013-148107
Jul. 17, 2013  (JP) ................. 2013-148108
Jul. 17, 2013  (JP) ................. 2013-148109

(51) Int. Cl.
*B60J 5/00* (2006.01)
*B60J 5/10* (2006.01)
(Continued)

(52) U.S. Cl.
CPC ........ *B60J 5/101* (2013.01); *B60J 5/06* (2013.01); *E05F 15/73* (2015.01); *E05Y 2900/531* (2013.01)

(58) Field of Classification Search
USPC ........... 701/49; 318/449–451; 49/27, 26, 7; 340/426.28, 505, 5.61, 5.2, 5.21, 340/426.36; 296/146.4; 324/658
See application file for complete search history.

(56) References Cited

U.S. PATENT DOCUMENTS 5,316,365 A * 5/1994 Kuhlman .............. B60J 5/06
    296/155
5,963,000 A * 10/1999 Tsutsumi .............. E05F 15/73
    250/221

(Continued)

FOREIGN PATENT DOCUMENTS

DE  10 2004 041 709 B3   10/2005
DE  10 2010 060 364 A1    5/2012
(Continued)

OTHER PUBLICATIONS

Development, Control, and Evaluation of an Actuated Car Door; Strolz, M.; Mortl, A.; Graf, M.; Buss, M.; Haptics, IEEE Transactions on; Year: 2009, vol. 2, Issue: 3; pp. 170-180, DOI: 10.1109/TOH.2009.19.*

(Continued)

*Primary Examiner* — Cuong H Nguyen
(74) *Attorney, Agent, or Firm* — Oblon, McClelland, Maier & Neustadt, L.L.P.

(57) ABSTRACT

A vehicle door opening and closing apparatus includes: a first detector installed in a vehicle, and detecting a foot portion of a detection target in the vicinity of a door of the vehicle a second detector detecting the detection target standing in a predetermined range from the door; and a control device determining whether the detection target has an intention of opening or closing the door based on whether a detection signal indicative of detecting the foot portion is input from the first detector, determining whether the door can be opened or closed based on the detection signal from the second detector, and determining whether a control unit outputs a drive signal for an opening or closing drive of the door to a door drive apparatus based on determination results from the first and second detectors.

18 Claims, 28 Drawing Sheets

(51) Int. Cl.
B60J 5/06 (2006.01)
E05F 15/73 (2015.01)

(56) References Cited

U.S. PATENT DOCUMENTS

| | | | | |
|---|---|---|---|---|
| 7,319,390 | B2* | 1/2008 | Takasuka | G08B 13/2491 340/522 |
| 7,354,097 | B2* | 4/2008 | Jackson | B60J 5/06 15/250.1 |
| 7,532,151 | B2* | 5/2009 | Touge | G01S 7/282 342/27 |
| 8,098,437 | B2* | 1/2012 | Chan | G02B 3/0025 359/455 |
| 8,788,152 | B2* | 7/2014 | Reimann | B60R 25/2036 296/146.4 |
| 8,874,324 | B2* | 10/2014 | Eggers | B60R 13/07 296/146.4 |
| 2004/0039511 | A1* | 2/2004 | Garnault | G07C 9/00023 701/49 |
| 2005/0179409 | A1* | 8/2005 | Honma | G01P 3/489 318/62 |
| 2007/0205863 | A1 | 9/2007 | Eberhard | |
| 2009/0160211 | A1* | 6/2009 | Krishnan | B60J 5/04 296/146.4 |
| 2011/0276234 | A1* | 11/2011 | Van Gastel | E05B 81/78 701/49 |
| 2012/0123649 | A1* | 5/2012 | Eggers | B60R 13/07 701/49 |
| 2013/0169408 | A1 | 7/2013 | Endo | |
| 2014/0039766 | A1 | 2/2014 | Miyake et al. | |

FOREIGN PATENT DOCUMENTS

| | | | | |
|---|---|---|---|---|
| EP | 2 159 362 A1 | | 3/2010 | |
| JP | 2005-133529 | | 5/2005 | |
| JP | 2005-315024 | | 11/2005 | |
| JP | 2008-138440 | | 6/2008 | |
| WO | WO2011/007008 | * | 1/2011 | ............. B60R 13/07 |
| WO | WO 2012/137608 A1 | | 10/2012 | |

OTHER PUBLICATIONS

Development and Evaluation of a Device for the Haptic Rendering of Rotatory Car Doors; Strolz, M.; Groten, R.; Peer, A.; Buss, M. Industrial Electronics, IEEE Transactions on; Year: 2011, vol. 58, Issue: 8; pp. 3133-3140, DOI: 10.1109/TIE.2010.2087292.*

Application of the equivalence principle and the multi excitation approach to method of moments simulations for optimizations of smart entry systems in vehicles; Tazi, H.; Bogdanov, F.; Eibert, T.F.; Microwave Conference (EuMC), 2010 European Year: 2010; pp. 232-235.*

Intelligent Control system based on CAN-bus for car doors and windows; Dai Qiang Wang; ShiYou Gao; Yu Qing Chen; Yi Wang; Qiao Liu; Anti-counterfeiting, Security, and Identification in Communication, 2009. ASID 2009. 3rd International Conference on Year: 2009; pp. 242-245, DOI: 10.1109/ICASID.2009.5276906.*

Extended European Search Report issued Nov. 25, 2015 in Patent Application No. 14177018.0.

* cited by examiner

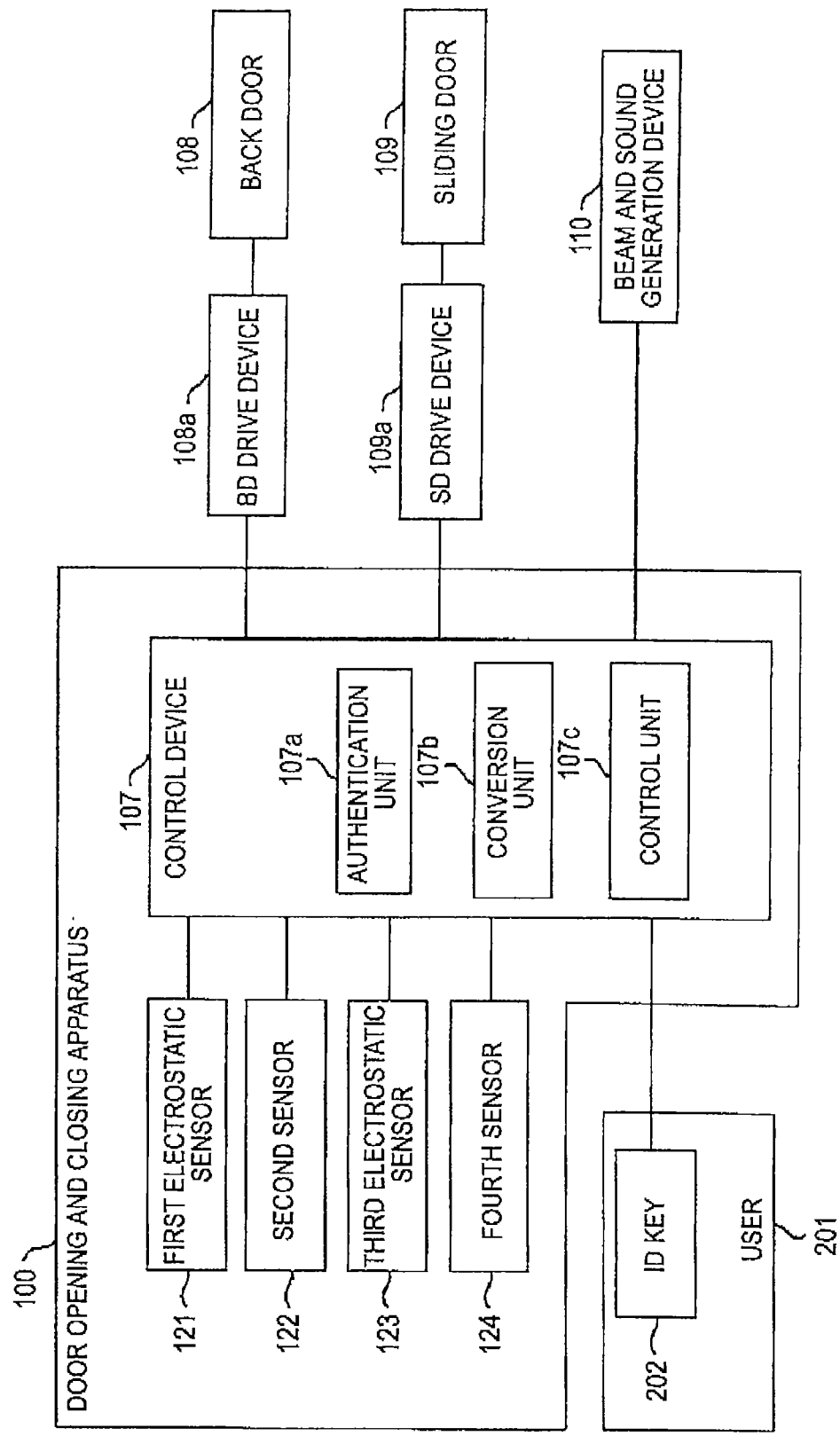

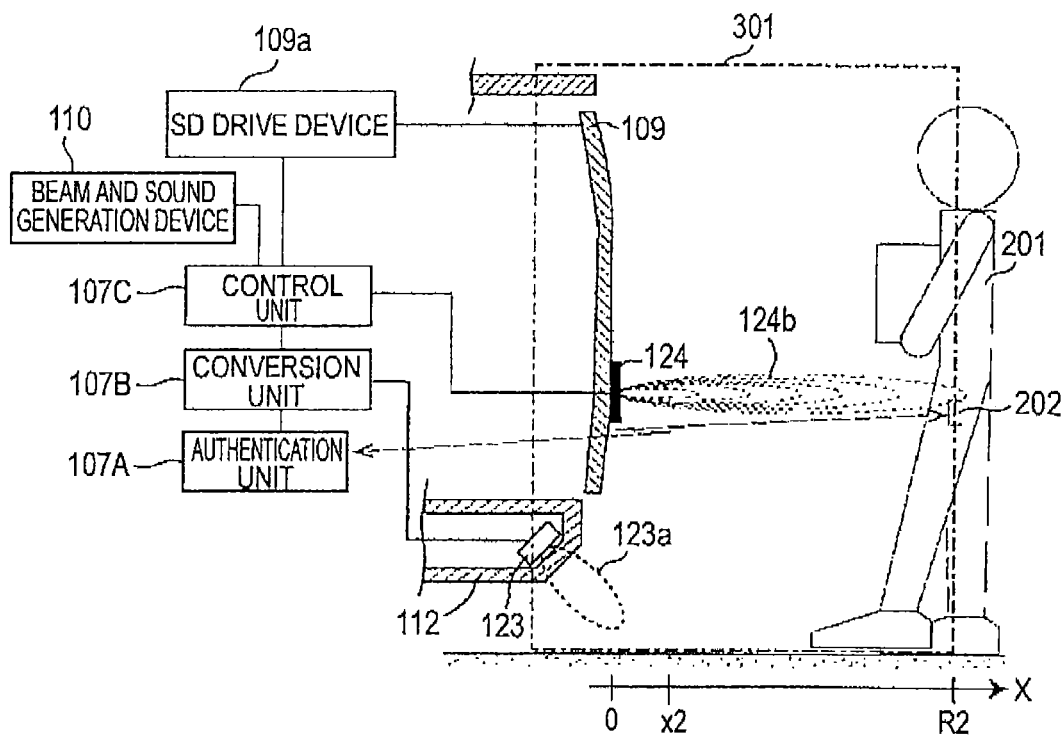
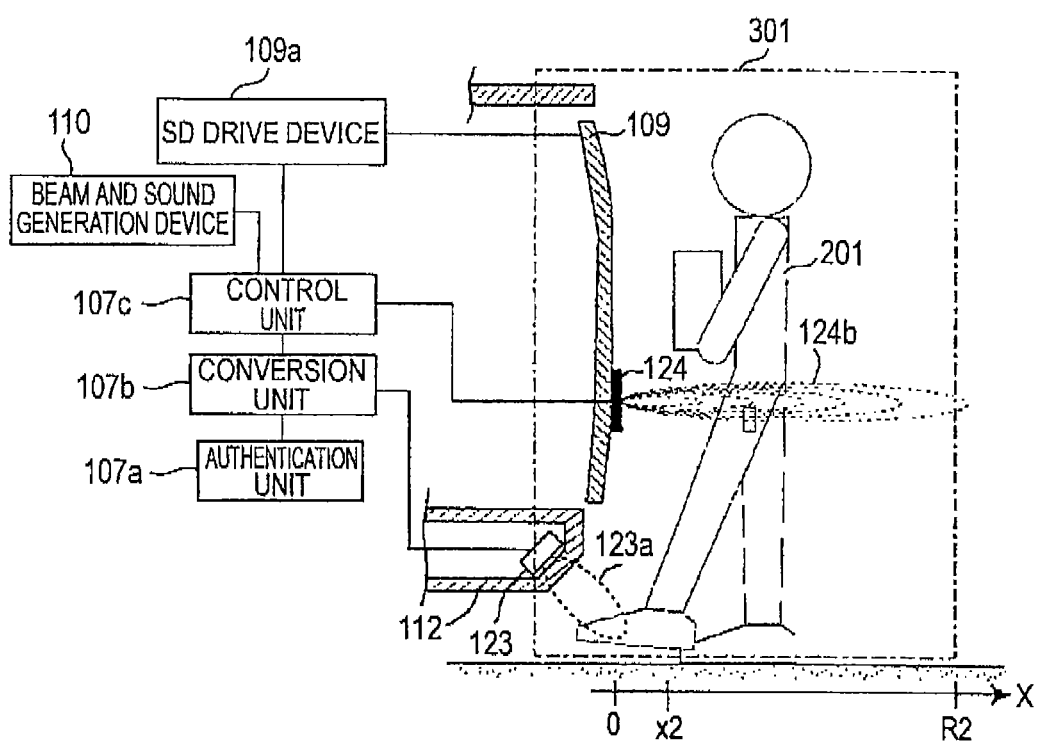

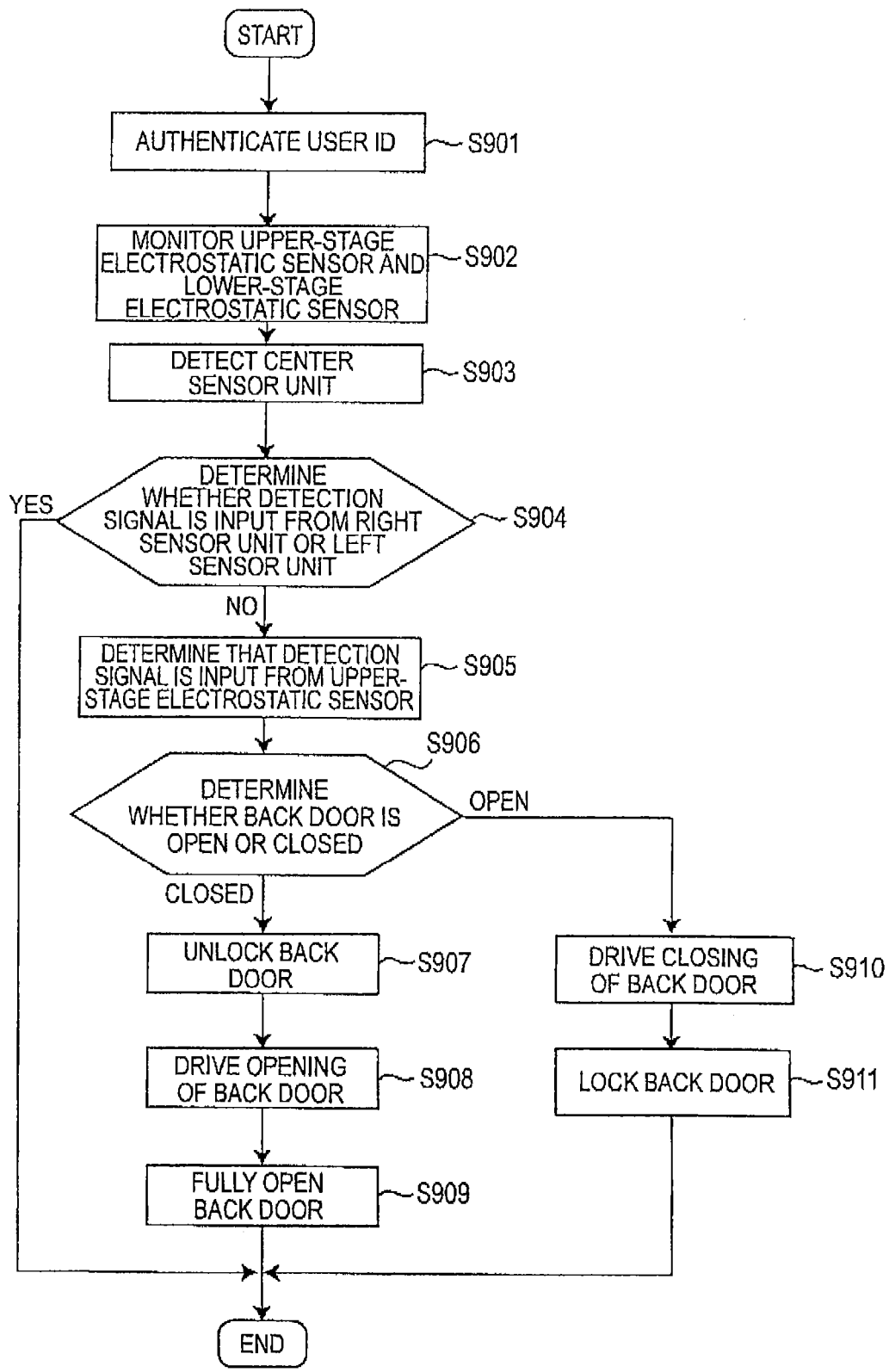

VEHICLE DOOR OPENING AND CLOSING APPARATUS AND METHOD OF CONTROLLING THE SAME

CROSS REFERENCE TO RELATED APPLICATIONS

This application is based on and claims priority under 35 U.S.C. §119 to Japanese Patent Applications 2013-148107, 2013-148108 and 2013-148109, all filed on Jul. 17, 2013, the entire contents of which are incorporated herein by reference.

TECHNICAL FIELD

This disclosure relates to a vehicle door opening and closing apparatus including electrostatic sensors which are respectively installed in lower and side portions of a vehicle, and a method of controlling the same.

BACKGROUND DISCUSSION

In the related art, a technology is disclosed in which a foot portion of a user is detected by a radio wave sensor for the opening and closing of a vehicle door, which is provided in a lower portion of a vehicle, and the vehicle door is opened or closed upon the detection of the foot portion (refer to JP2005-133529A (Reference 1)). In the technology disclosed in Reference 1, the detecting sensor is provided in a concave portion formed in a rear bumper or a side sill cover, so as to face the ground, and when the detecting sensor detects the foot portion of the user, a corresponding vehicle door is automatically opened.

In the technology disclosed in Reference 1, the user is required to approach the vehicle, almost coming into contact with the vehicle, in such a manner that the detecting sensor for the opening of a vehicle door operates. After the user approaches the vehicle, almost coming into contact with the vehicle so as to active the detecting sensor, the user is required to immediately and sufficiently separate from the vehicle so that the user can avoid collision with the automatically opening vehicle door. When the user holds large luggage in the hands, it is difficult for the user to sufficiently approach the vehicle so as to operate the detecting sensor. As such, the technology of the related art has the problem related to user-friendliness or the safety of the user.

SUMMARY

Thus, a need exists for a vehicle door opening and closing apparatus which is not suspectable to the drawback mentioned above.

An aspect of this disclosure is directed to a vehicle door opening and closing apparatus including a first detector that is installed in a vehicle, and detects a foot portion of a detection target in the vicinity of a door of the vehicle; a second detector that detects the detection target that stands in a predetermined range from the door of the vehicle; that includes a control unit which outputs a drive signal for an opening drive or a closing drive of the door to a door drive apparatus, and the control device that determines whether the detection target has an intention of opening or closing the door based on whether a detection signal indicative of detecting the foot portion is input from the first detector, that determines whether the door can be opened or closed based on the detection signal from the second detector, and that determines whether the control unit outputs a the drive signal for thean opening drive or thea closing drive of the door to a door drive apparatus based on determination results from the first and second detectors.

According to the aspect of this disclosure, it is determined whether the user has an intention of opening or closing the vehicle door based on input from a single sensor, and thus it is possible to improve user-friendliness relative to the opening and closing of the vehicle door. In addition, it can be determined whether the user does not stand in a predetermined range from the vehicle door, and the vehicle door can be opened or closed based on input from another sensor, and thus it is possible to ensure the safety of the user.

BRIEF DESCRIPTION OF THE DRAWINGS

The foregoing and additional features and characteristics of this disclosure will become more apparent from the following detailed description considered with the reference to the accompanying drawings, wherein:

FIG. 13 is a block diagram of the vehicle door opening and closing apparatus according to the fifth embodiment of this disclosure;

FIGS. 18A and 18B are conceptual views describing the usage of the vehicle door opening and closing apparatus according to a sixth embodiment of this disclosure;

FIG. 26 is a control flow chart of the control device according to the eighth embodiment of this disclosure;

DETAILED DESCRIPTION

Hereinafter, exemplary embodiments for the implementation of this disclosure will be described in detail with reference to the accompanying drawings. In the following embodiments, dimensions, materials, shapes, relative positions of configuration elements, and the like are arbitrarily illustrated, and can be changed depending on a structure or various conditions of an apparatus to which this disclosure is applied. Unless otherwise specifically stated, the scope of this disclosure is not limited to aspects that are specifically stated in the following embodiments. In the following drawings, the same reference signs are assigned to the configuration elements having the same functions, and the descriptions thereof will not be repeatedly described.

First Embodiment

A first embodiment of this disclosure relates to a vehicle door opening and closing apparatus that automatically opens and closes a back door when a user approaches the back door (a vehicle door which the user intends to open) of a vehicle, and holds up a foot portion over an electrostatic sensor installed in a rear bumper.

Configuration

Figure 1:
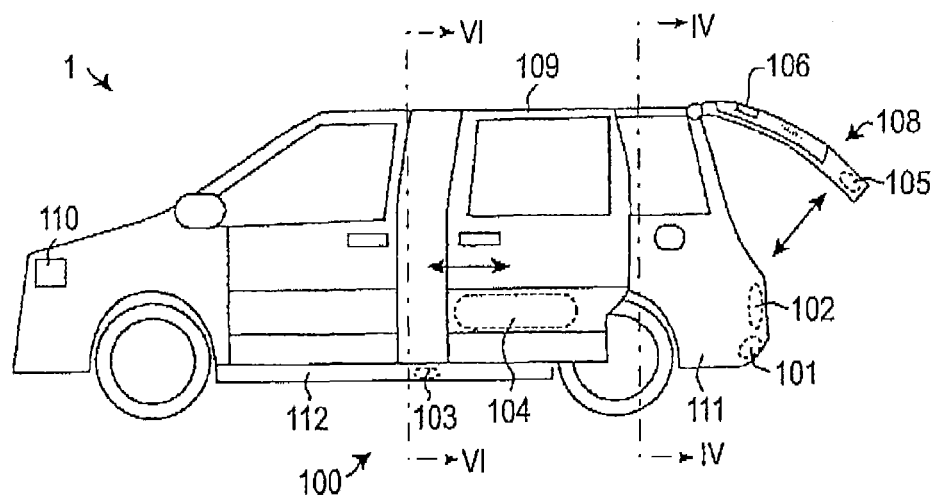
FIG. 1 is a side schematic view of a vehicle according to a first embodiment of this disclosure.
Figure 2:
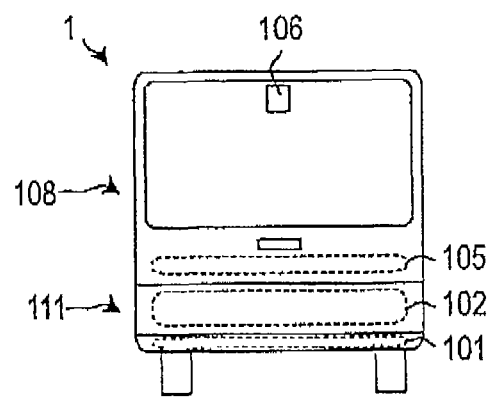
FIG. 2 is a schematic view of the vehicle according to the first embodiment of this disclosure when seen from the back.
Figure 3:
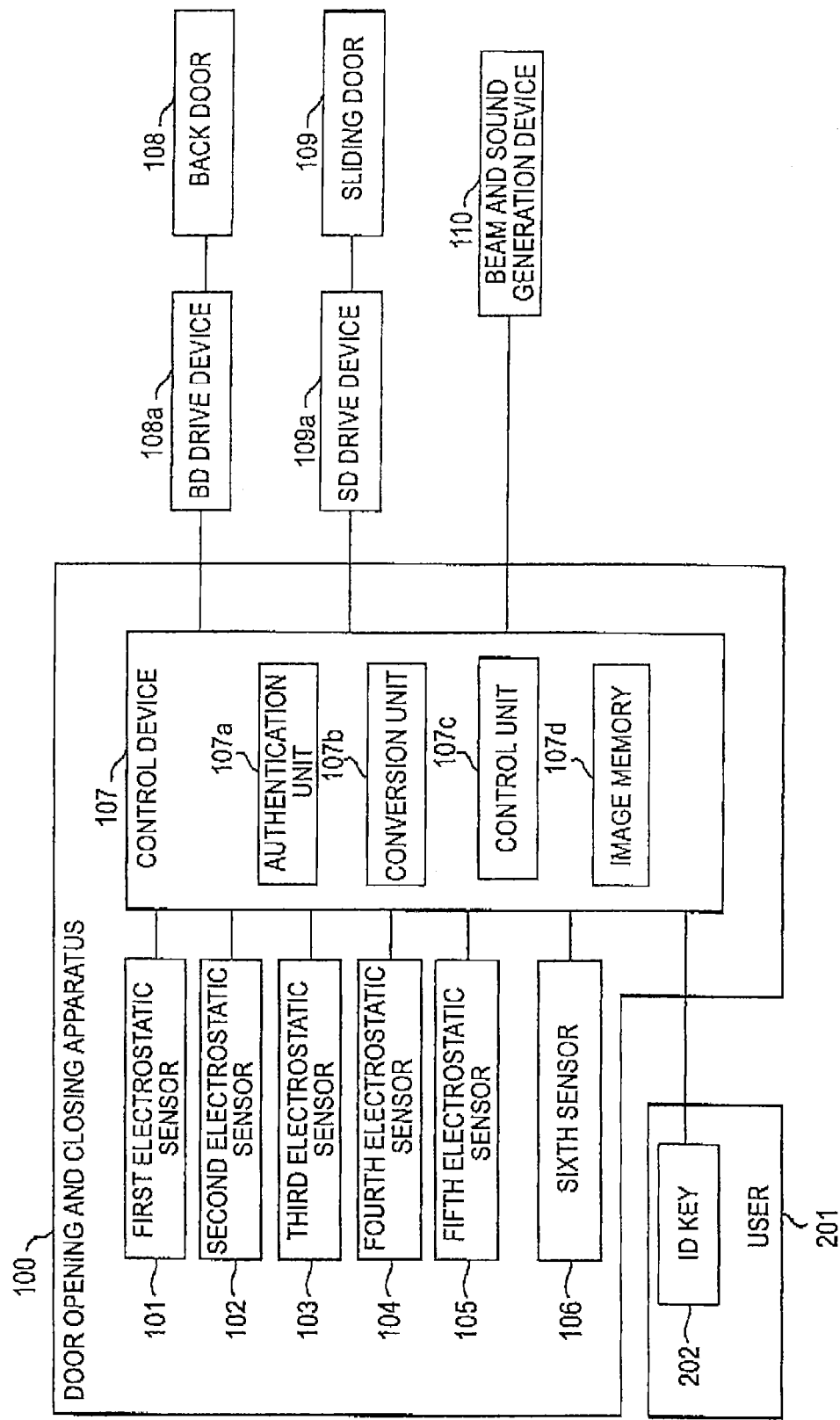
FIG. 3 is a block diagram of a vehicle door opening and closing apparatus according to the first embodiment of this disclosure.
Figure 4:
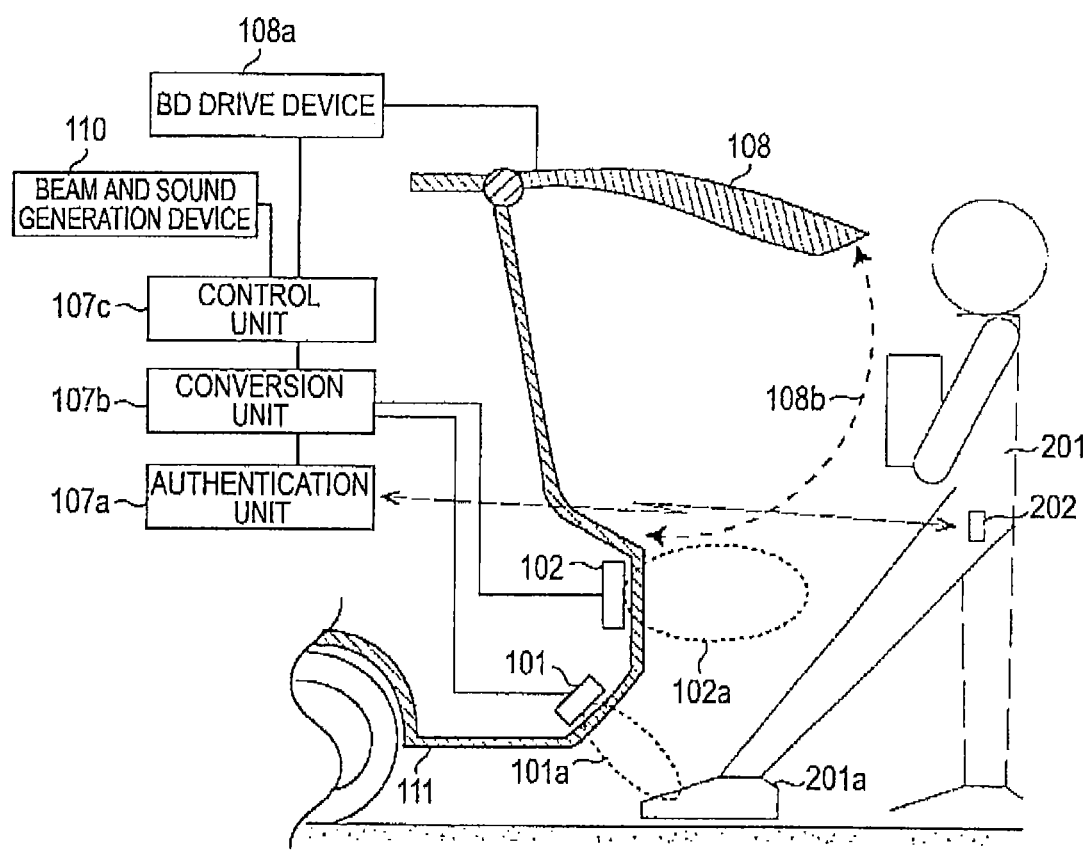
FIG. 4 is a conceptual view describing usage of the vehicle door opening and closing apparatus according to the first embodiment of this disclosure.

Described are configuration elements of the vehicle door opening and closing apparatus according to the embodiment, and functions of the configuration elements. FIGS. 1 and 2 are a side schematic view and a rear schematic view of a vehicle 1 equipped with a vehicle door opening and closing apparatus 100 according to the first embodiment of the present invention, respectively. FIG. 3 is a block diagram of the vehicle door opening and closing apparatus 100. FIG. 4 is a cross-sectional view taken along line IV-IV in FIG. 1, conceptually describing as to how a user 201, that is, a detection target, uses the vehicle door opening and closing apparatus 100.

As illustrated in FIG. 3, the vehicle door opening and closing apparatus 100 according to the embodiment includes a first electrostatic sensor 101 which is a first detector; a second electrostatic sensor 102 which is a second detector; and a control device 107. The vehicle door opening and closing apparatus 100 may include third to fifth electrostatic sensors 103 to 105 and a sixth sensor 106. That is, this disclosure is not limited to the configuration in which the vehicle door opening and closing apparatus 100 according to the embodiment includes all of the first to fifth electrostatic sensors 101 to 105, and the sixth sensor 106. This disclosure may also have various configurations in other embodiments.

Each of the first to fifth electrostatic sensors 101 to 105 contains sensor electrodes, and may be a passive electrostatic sensor that detects a change in electrostatic capacity between the sensor electrodes and the detection target (the user), or may be an active electrostatic sensor that generates an electric field between the sensor electrodes, and detects a change in electric field resulting from the detection target. Each of the first to fifth electrostatic sensors 101 to 105 has sensing regions 101a to 105a, each of which is located in a predetermined range from the sensor electrodes. It is possible to adjust the sizes of the sensing regions 101a to 105a by adjusting the areas of the respective sensor electrodes, based on a formula $C=\epsilon S/d$ (C: electrostatic capacity, $\epsilon$: permittivity, S: area of electrode, d: distance between electrodes). The first to fifth electrostatic sensors 101 to 105 can measure a distance between the detection target and each of the respective sensor electrodes. Since the first to fifth electrostatic sensors 101 to 105 can detect the detection target which is located in the vicinity of poles (portions in contact with the sensor electrodes) of the respective sensor electrodes, it is possible to relatively reduce detection errors, and to improve user-friendliness.

The sixth sensor 106 is a sensor that detects the detection target by using radio waves or light, or a digital camera, and can detect the detection target in the sensing region 106a. For example, the sensor detecting the detection target by using radio waves or light detects the detection target based on a change in strength of the received radio waves or the light. The digital camera detects the detection target by processing captured images.

The control device 107 is a computer including an arithmetic calculation unit and a storage region, and contains an authentication unit 107a; a conversion unit 107b; a control unit 107c; and an image memory 107d. The control device 107 processes signals from the first to fifth electrostatic sensors 101 to 105, the sixth sensor 106, and an ID key 202. The control device 107 outputs control signals to a back door (BD) drive device 108a, a sliding door (SD) drive device 109a, and a beam and sound generation device 110 based on the processed results. The BD drive device 108a and the sliding door drive device 109a are equivalent to door drive devices. The BD drive device 108a performs an opening drive or a closing drive on a back door 108 of the vehicle 1 based on the drive signal from the control device 107, and the SD drive device 109a performs an opening drive or a closing drive on a sliding door 109 of the vehicle 1 based on the drive signal from the control device 107. The beam and sound generation device 110 sends an alarm to the user by generating predetermined light or sound based on the control signal from the control device 107.

The authentication unit 107*a* of the control device 107 receives a signal from the ID key 202 via an antenna, and authenticates that the user 201 in the vicinity of the vehicle 1 is a user of the vehicle 1 (success of authentication). Upon the successful authentication by the authentication unit 107*a*, the vehicle door opening and closing apparatus 100 may operate. The conversion unit 107*b* converts a signal indicative of a change in electrostatic capacity output from each of the first to fifth electrostatic sensors 101 to 105 into a voltage or the like. The control unit 107*c* processes the converted signal, and controls the functions of the BD drive device 108*a*, the SD drive device 109*a*, and the beam and sound generation device 110 based on the processed results. The control unit 107*c* can monitor the first to fifth electrostatic sensors 101 to 105, and the sixth sensor 106, and can determine whether the sensors appropriately detect the detection target. Furthermore, the control unit 107*c* can monitor the BD drive device 108*a*, and the SD drive device 109*a*, and can determine whether the back door 108 and the sliding door 109 are open or closed. The image memory 107*d* stores image data acquired by the digital camera 106. The control unit 107*c* processes the image data, and controls the functions the BD drive device 108*a*, the SD drive device 109*a*, and the beam and sound generation device 110.

As illustrated in FIG. 4, the first electrostatic sensor 101 is installed in a rear bumper (or an undercover) 111 of the vehicle 1, and the sensing region 101*a* is oriented to the outside of the vehicle 1 at a predetermined angle with respect to a vertical direction. The first electrostatic sensor 101 is mainly used so as to detect a foot portion 201*a* of the user 201, and to determine whether the user 201 has an intention of opening or closing the back door 108. There is no limitation to the maximum distance of the sensing region 101*a* of the first electrostatic sensor 101, but the sensing region 101*a* may have the maximum distance of 10 cm to 20 cm. Typically, unlike a sensing region obtainable by using light or radio waves, the sensing region of the electrostatic sensor is almost not affected by a resin material, and thus the first electrostatic sensor 101 can be installed in the resin-made rear bumper 111 as in the embodiment. Compared to a configuration of the related art in which a radio wave sensor is installed in an exposed manner in a concave portion formed in the rear bumper, in the configuration of the embodiment in which the first electrostatic sensor 101 is installed in the rear bumper 111, it is possible to reduce sensing performance degradation resulting from a build-up of dirt or dust, and also to provide a good design.

The second electrostatic sensor 102 is positioned above the first electrostatic sensor 101, and is installed in the rear bumper 111 similar to the first electrostatic sensor 101. The sensing region 102*a* of the second electrostatic sensor 102 is oriented to the outside of the vehicle 1, and is positioned at a height at which the second electrostatic sensor 102 can detect the body of the user except for the foot portion. Here, "the body of the user" includes an object, for example, luggage of the user, by which the safety of the user can be affected when the vehicle door collides with the object. The second electrostatic sensor 102 is mainly used so as to confirm that the user 201 does not stand in an opening and closing trajectory 108*b* (a trajectory which is drawn by an end of the back door 108 when the back door 108 is opened and closed) of the back door 108. That is, the fact that the user 201 is not detected by the second electrostatic sensor 102 indicates that the user 201 does not stand in the opening and closing trajectory 108*b* of the back door 108, and thus the safety of the user 201 is ensured. There is no limitation to the maximum distance of the sensing region 102*a* of the second electrostatic sensor 102, but the sensing region 102*a* may have the maximum distance of 10 cm to 1 m. Since the body of the user 201 is relatively lager than the foot portion 201*a*, an area (S) of the second electrostatic sensor 102 may be larger than an area (S) of the first electrostatic sensor 101. Accordingly, the sensing region 102*a* also becomes relatively large.

Relationships in size, orientation and position between the respective sensing regions 101*a* and 102*a* of the first and second electrostatic sensors 101 and 102 are designed in advance based on the opening and closing trajectory 108*b* of the back door 108, or physical features (for example, the average height of adults) of a typical user. For example, the sizes, orientations and positions of the respective sensing regions 101*a* and 102*a* of the first and second electrostatic sensors 101 and 102 are adjusted in such a manner that the first electrostatic sensor 101 detects the foot portion 201*a*, and the second electrostatic sensor 102 does not detect the body of the user 201 when the user 201 standing out of the opening and closing trajectory 108*b* of the back door 108 puts the foot portion 201*a* toward the first electrostatic sensor 101. The size, orientation, and position may be appropriately adjusted based on a preference of the user 201.

Operation

The operations of the configuration elements of the vehicle door opening and closing apparatus 100 will be described. When the user 201 with the ID key 202 approaches a predetermined range of the vehicle 1, the authentication unit 107*a* of the control device 107 communicates with the ID key 202 via the antenna. The authentication unit 107*a* authenticates that the user 201 is a user of the vehicle 1 based on a signal from the ID key 202 (success of authentication). At this time, the control unit 107*c* outputs a control signal to the beam and sound generation device 110. The beam and sound generation device 110 may generate light or sound, and notify the user 201 that the authentication is successful. Upon the successful authentication by the authentication unit 107*a*, the vehicle door opening and closing apparatus 100 may operate.

The control unit 107*c* monitors the second electrostatic sensor 102, and confirms that the user 201 is not detected by the second electrostatic sensor 102, in other words, that the user 201 does not stand in the sensing region 102*a*. When the user 201 is detected by the second electrostatic sensor 102, the control unit 107*c* may output a control signal to the beam and sound generation device 110. In addition, the beam and sound generation device 110 may generate light or sound, and encourage the user 201 to separate from the vehicle 1.

When the user 201 puts the foot portion 201*a* in the sensing region 101*a* of the first electrostatic sensor 101, the first electrostatic sensor 101 detects the foot portion 201*a*, and outputs a detection signal to the conversion unit 107*b*. At this time, a detecting operation of the first electrostatic sensor 101 may start (be triggered), when the user 201 puts the foot portion 201*a* in the sensing region 101*a* for a few seconds, or the user 201 puts the foot portion 201*a* in and out of the sensing region 101*a* in multiple times. In this manner, it becomes apparently determined that the user 201 has an intention of opening or closing the door. The control unit 107*c* processes the detection signal converted by the conversion unit 107*b*, and outputs a drive signal for an opening drive or a closing drive to the BD drive apparatus 108*a*. The BD drive apparatus 108*a* performs an opening drive or a closing drive on the back door 108 based on the drive signal.

Figure 5:
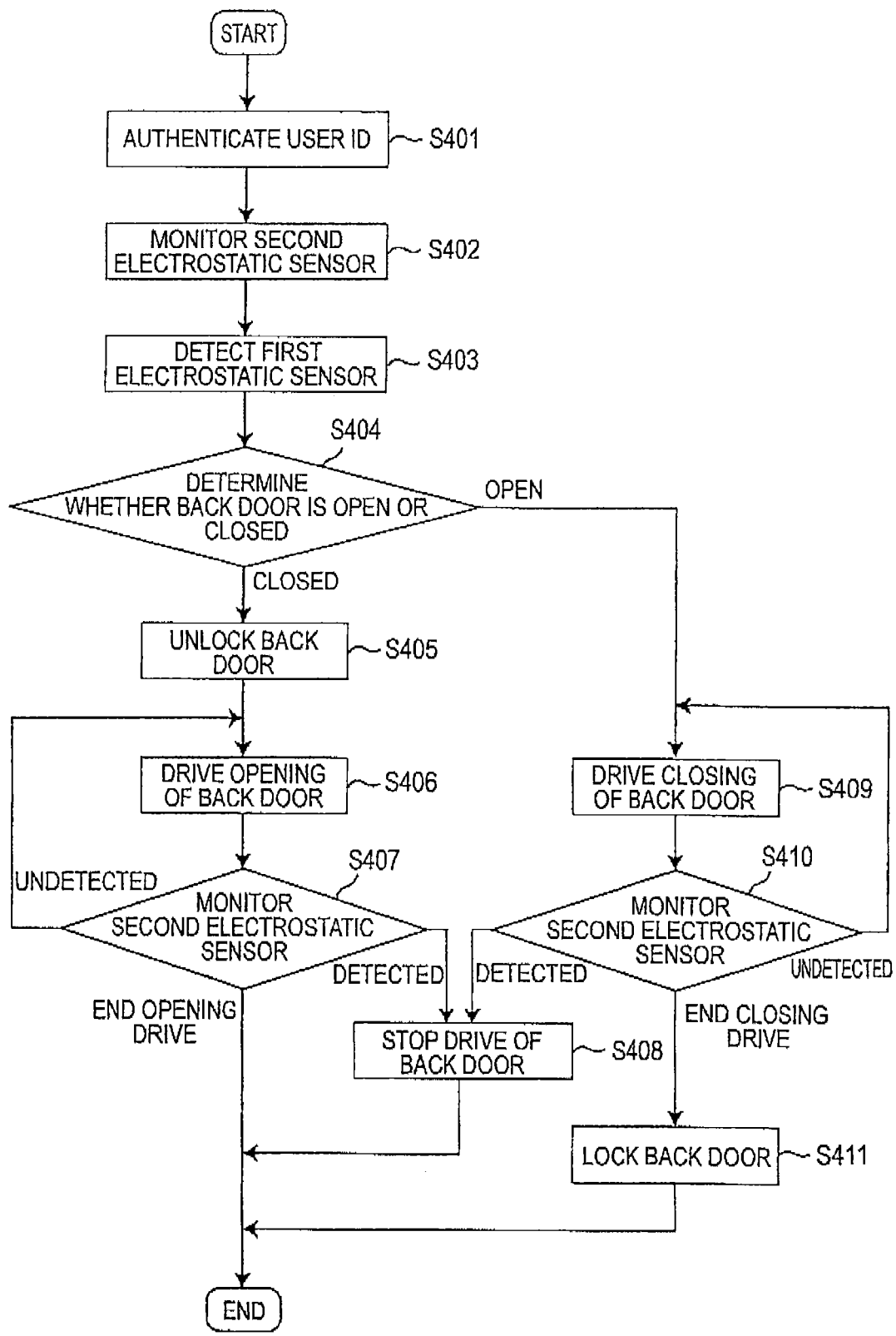
FIG. 5 is a control flow chart of a control device according to the first embodiment of this disclosure.

FIG. 5 is a flow chart describing controls performed by the control device 107 of the vehicle door opening and closing apparatus 100. Step S401: the authentication unit 107a communicates with the ID key 202 via the antenna, and authenticates that the user 201 is a user of the vehicle 1 based on a signal from the ID key 202 (success of authentication).

Step S402: the control unit 107c monitors the second electrostatic sensor 102, and confirms that the user 201 is not detected by the second electrostatic sensor 102, in other words, that the user 201 does not stand in the sensing region 102a.

Step S403: the conversion unit 107b converts a detection signal from the first electrostatic sensor 101, and the conversion unit 107b inputs the converted detection signal to the control unit 107c.

Step S404: the control unit 107c monitors the BD drive apparatus 108a, and determines whether the back door 108 is open or closed.

Step S405: when the back door 108 is closed, the control unit 107c outputs a drive signal to the BD drive apparatus 108a, and the BD drive apparatus 108a unlocks the back door 108 based on the drive signal.

Step S406: the control unit 107c outputs a drive signal to the BD drive apparatus 108a, and the BD drive apparatus 108a performs an opening drive on the back door 108 based on the drive signal.

Step S407: the control unit 107c monitors the second electrostatic sensor 102. When the user 201 is not detected by the second electrostatic sensor 102, step S406 is repeatedly performed. When the opening drive of the back door 108 ends, the operation of the vehicle door opening and closing apparatus 100 ends.

Step S408: when the user 201 is detected by the second electrostatic sensor 102, the control unit 107c outputs a drive stop signal to the BD drive apparatus 108a. The BD drive apparatus 108a stops the opening drive of the back door 108 based on the drive stop signal, and the operation of the vehicle door opening and closing apparatus 100 ends.

Step S409: when the back door 108 is open, the control unit 107c outputs a drive signal to the BD drive apparatus 108a, and the BD drive apparatus 108a performs a closing drive on the back door 108 based on the drive signal.

Step S410: the control unit 107c monitors the second electrostatic sensor 102. When the user 201 is not detected by the second electrostatic sensor 102, step S409 is repeatedly performed.

Step S408: when the user 201 is detected by the second electrostatic sensor 102, the control unit 107c outputs a drive stop signal to the BD drive apparatus 108a. The BD drive apparatus 108a stops the closing drive of the back door 108 based on the drive stop signal, and the operation of the vehicle door opening and closing apparatus 100 ends.

Step S411: when the closing drive of the back door 108 ends, the control unit 107c outputs a drive signal to the BD drive apparatus 108a, and the BD drive apparatus 108a locks the back door 108 based on the drive signal. The operation of the vehicle door opening and closing apparatus 100 ends.

The vehicle door opening and closing apparatus according to the embodiment performs an opening drive or a closing drive on the vehicle door when the first electrostatic sensor detects the foot portion of the user, and thus it is possible to improve user-friendliness relative to the opening and closing of the vehicle door. Furthermore, the vehicle door opening and closing apparatus according to the embodiment demands that the user stand out of the opening and closing trajectory of the back door based on the detection result of the second electrostatic sensor, and thus it is possible to ensure the safety of the user.

Second Embodiment

A second embodiment of this disclosure relates to the vehicle door opening and closing apparatus that automatically opens and closes a sliding door when the user approaches the vehicle, and holds up the foot portion over the electrostatic sensor installed in a side bumper (or an aero part, or a sill cover).

Configuration

The configuration elements of the vehicle door opening and closing apparatus 100 according to the embodiment, and the functions of the configuration elements will be described. The vehicle door opening and closing apparatus 100 according to the embodiment includes the third electrostatic sensor 103 which is a first detector; the fourth electrostatic sensor 104 which is a second detector; and the control device 107. The vehicle door opening and closing apparatus 100 may also include the first and second electrostatic sensors 101 and 102, the fifth electrostatic sensor 105, and the sixth sensor 106.

Figure 6:
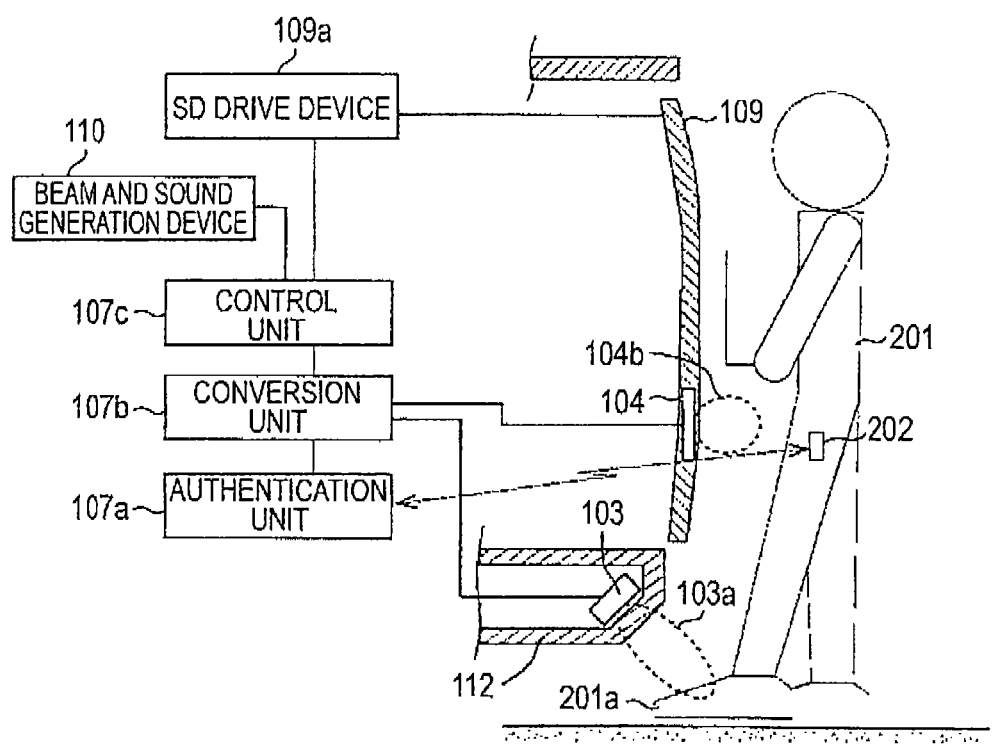
FIG. 6 is a conceptual view describing the usage of the vehicle door opening and closing apparatus according to a second embodiment of this disclosure.

FIG. 6 is a cross-sectional view taken along line VI-VI in FIG. 1, conceptually describing as to how the user 201 uses the vehicle door opening and closing apparatus 100. The third electrostatic sensor 103 is installed in the side bumper (or the aero part, or the sill cover) 112 of the vehicle 1, and a sensing region 103a of the third electrostatic sensor 103 is oriented to the outside of the vehicle 1 at a predetermined angle with respect to the vertical direction. The third electrostatic sensor 103 is mainly used so as to detect the foot portion 201a of the user 201, and to determine whether the user 201 has an intention of opening or closing the sliding door 109. There is no limitation to the maximum distance of the sensing region 103a of the third electrostatic sensor 103, but the sensing region 103a may have the maximum distance of 10 cm to 20 cm. Typically, unlike a sensing region obtainable by using light or radio waves, the sensing region of the electrostatic sensor is almost not affected by a resin material, and thus the third electrostatic sensor 103 can be installed in the resin-made side bumper as described in the embodiment. Compared to the configuration of the related art in which the radio wave sensor is installed in an exposed manner in a concave portion formed in the side bumper, in the configuration of the embodiment in which the third electrostatic sensor 103 is installed in the side bumper 112, it is possible to reduce sensing performance degradation resulting from a build-up of dirt or dust, and also to provide a good design.

The fourth electrostatic sensor 104 is positioned above the third electrostatic sensor 103, and is installed in the sliding door 109 similar to the third electrostatic sensor 103. A sensing region 104a of the fourth electrostatic sensor 104 is oriented to the outside of the vehicle 1, and is positioned at a height at which the fourth electrostatic sensor 104 can detect the body of the user 201 except for the foot portion. The fourth electrostatic sensor 104 is mainly used so as to confirm that the body of the user 201 does not stand in a predetermined range from the sliding door 109. That is, the fact that the user 201 is not detected by the fourth electrostatic sensor 104 indicates that the user 201 separates a predetermined distance from the sliding door 109, and thus the safety of the user 201 is ensured. There is no limitation to the maximum distance of the sensing region 104a of the fourth electrostatic sensor 104, but the sensing region 104a may have the maximum distance of 10 cm to 1 m. Since the body of the user 201 is relatively lager than the foot portion 201*a*, an area (S) of the fourth electrostatic sensor 104 may be larger than an area (S) of the third electrostatic sensor 103.

Relationships in size, orientation and position between the respective sensing regions 103*a* and 104*a* of the third and fourth electrostatic sensors 103 and 104 are designed in advance based on an opening and closing trajectory (a distance in which the user 201 is not caught in the sliding door 109) of the sliding door 109, or physical features (for example, the average height of adults) of a typical user. For example, the sizes, orientations and positions of the respective sensing regions 103*a* and 104*a* of the third and fourth electrostatic sensors 103 and 104 are adjusted in such a manner that the third electrostatic sensor 103 detects the foot portion 201*a*, and the fourth electrostatic sensor 104 does not detect the user 201 when the user 201 standing out of a predetermined range (the distance in which the user 201 is not caught in the sliding door 109) from the sliding door 109 puts the foot portion 201*a* toward the third electrostatic sensor 103. The size, orientation, and position may be appropriately adjusted based on a preference of the user 201.

Operation

The operations of the configuration elements of the vehicle door opening and closing apparatus 100 according to the embodiment will be described. The control unit 107*c* monitors the fourth electrostatic sensor 104, and confirms that the user 201 is not detected by the fourth electrostatic sensor 104, in other words, that the user 201 does not stand in the sensing region 104*a*. When the user 201 is detected by the fourth electrostatic sensor 104, the control unit 107*c* may output a control signal to the beam and sound generation device 110. In addition, the beam and sound generation device 110 may generate light or sound, and encourage the user 201 to separate from the vehicle 1.

When the user 201 puts the foot portion 201*a* in the sensing region 103*a* of the third electrostatic sensor 103, the third electrostatic sensor 103 detects the foot portion 201*a*, and outputs a detection signal to the conversion unit 107*b*. The control unit 107*c* processes the detection signal converted by the conversion unit 107*b*, and outputs a drive signal to the SD drive apparatus 109*a*. The SD drive apparatus 109*a* performs an opening drive or a closing drive on the sliding door 109 based on the drive signal.

Figure 7:
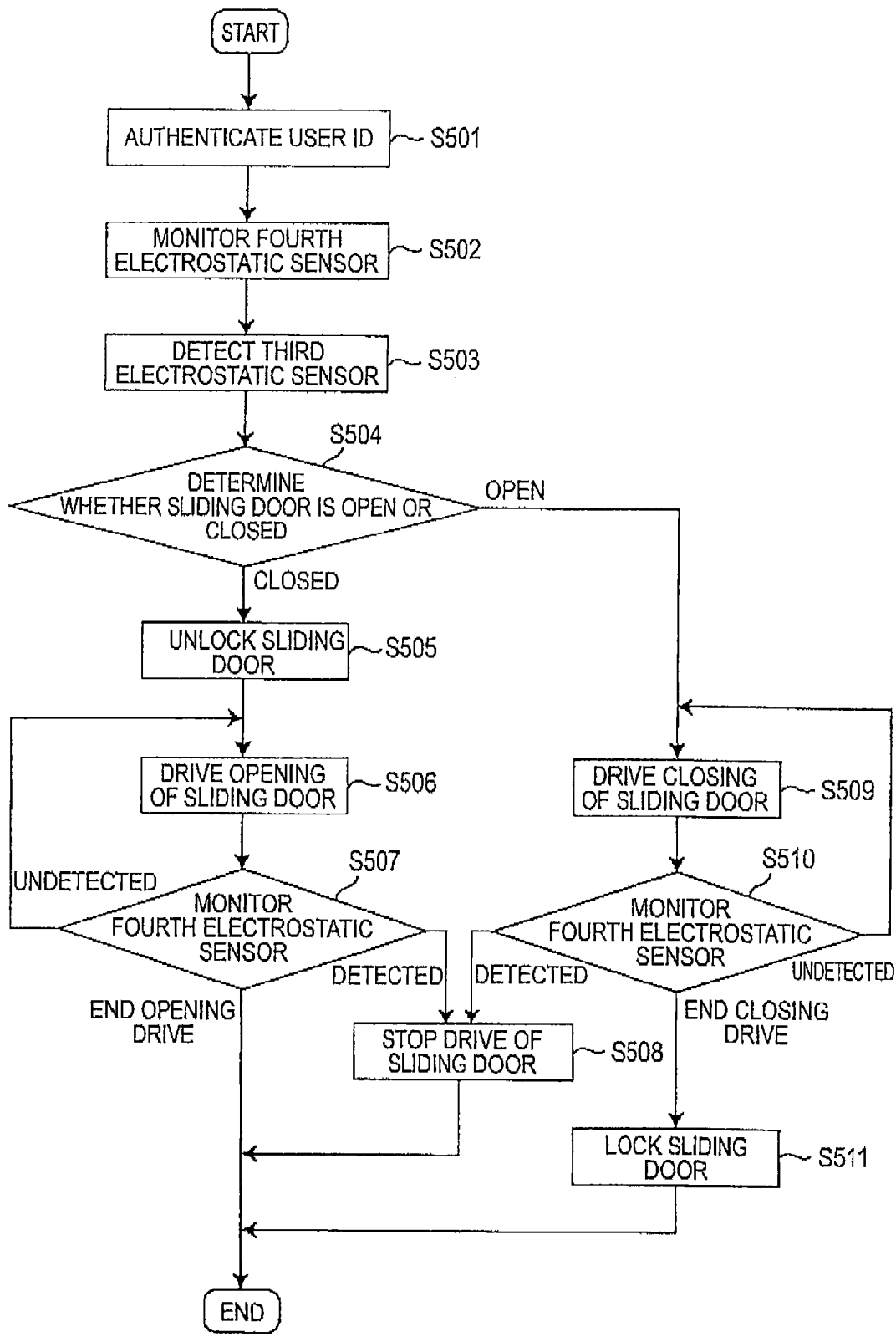
FIG. 7 is a control flow chart of the control device according to the second embodiment of this disclosure.

FIG. 7 is a flow chart describing controls performed by the control device 107 of the vehicle door opening and closing apparatus 100.

Step S501: the authentication unit 107*a* communicates with the ID key 202 via the antenna, and authenticates that the user 201 is a user of the vehicle 1 based on a signal from the ID key 202 (success of authentication).

Step S502: the control unit 107*c* monitors the fourth electrostatic sensor 104, and confirms that the user 201 is not detected by the fourth electrostatic sensor 104, in other words, that the user 201 does not stand in the sensing region 104*a*.

Step S503: the conversion unit 107*b* converts a detection signal from the third electrostatic sensor 103, and the conversion unit 107*b* inputs the converted detection signal to the control unit 107*c*.

Step S504: the control unit 107*c* monitors the SD drive apparatus 109*a*, and determines whether the sliding door 109 is open or closed.

Step S505: when the sliding door 109 is closed, the control unit 107*c* outputs a drive signal to the SD drive apparatus 109*a*, and the SD drive apparatus 109*a* unlocks the sliding door 109 based on the drive signal.

Step S506: the control unit 107*c* outputs a drive signal to the SD drive apparatus 109*a*, and the SD drive apparatus 109*a* performs an opening drive on the sliding door 109 based on the drive signal.

Step S507: the control unit 107*c* monitors the fourth electrostatic sensor 104. When the user 201 is not detected by the fourth electrostatic sensor 104, step S506 is repeatedly performed. When the opening drive of the sliding door 109 ends, the operation of the vehicle door opening and closing apparatus 100 ends.

Step S508: when the user 201 is detected by the fourth electrostatic sensor 104, the control unit 107*c* outputs a drive stop signal to the SD drive apparatus 109*a*. The SD drive apparatus 109*a* stops the opening drive of the sliding door 109 based on the drive stop signal, and the operation of the vehicle door opening and closing apparatus 100 ends.

Step S509: when the sliding door 109 is open, the control unit 107*c* outputs a drive signal to the SD drive apparatus 109*a*, and the SD drive apparatus 109*a* performs a closing drive on the sliding door 109 based on the drive signal.

Step S510: the control unit 107*c* monitors the fourth electrostatic sensor 104. When the user 201 is not detected by the fourth electrostatic sensor 104, step S509 is repeatedly performed.

Step S508: when the user 201 is detected by the fourth electrostatic sensor 104, the control unit 107*c* outputs a drive stop signal to the SD drive apparatus 109*a*. The SD drive apparatus 109*a* stops the closing drive of the sliding door 109 based on the drive stop signal, and the operation of the vehicle door opening and closing apparatus 100 ends.

Step S511: when the closing drive of the sliding door 109 ends, the control unit 107*c* outputs a drive signal to the SD drive apparatus 109*a*, and the SD drive apparatus 109*a* locks the sliding door 109 based on the drive signal. The operation of the vehicle door opening and closing apparatus 100 ends.

The vehicle door opening and closing apparatus according to the embodiment performs an opening drive or a closing drive on the vehicle door when the third electrostatic sensor detects the foot portion of the user, and thus it is possible to improve user-friendliness relative to the opening and closing of the vehicle door. Furthermore, the vehicle door opening and closing apparatus according to the embodiment demands that the user separate a predetermined distance from the sliding door based on the detection result of the fourth electrostatic sensor, and thus it is possible to ensure the safety of the user.

Third Embodiment

A third embodiment of this disclosure relates to the vehicle door opening and closing apparatus that automatically opens the back door when the user approaches the vehicle, and holds up the foot portion over the electrostatic sensor installed in a lower portion of the rear bumper.

Configuration

The configuration elements of the vehicle door opening and closing apparatus 100 according to the embodiment, and the functions of the configuration elements will be described. The vehicle door opening and closing apparatus 100 according to the embodiment is substantially the same as the vehicle door opening and closing apparatus according to the first embodiment. The vehicle door opening and closing apparatus 100 includes the first electrostatic sensor 101 which is a first detector; the fifth electrostatic sensor 105 which is a second detector, and the control device 107. The vehicle door opening and closing apparatus 100 may also include the second to fourth electrostatic sensors 102 and 104, and the sixth sensor 106.

Figure 8A:
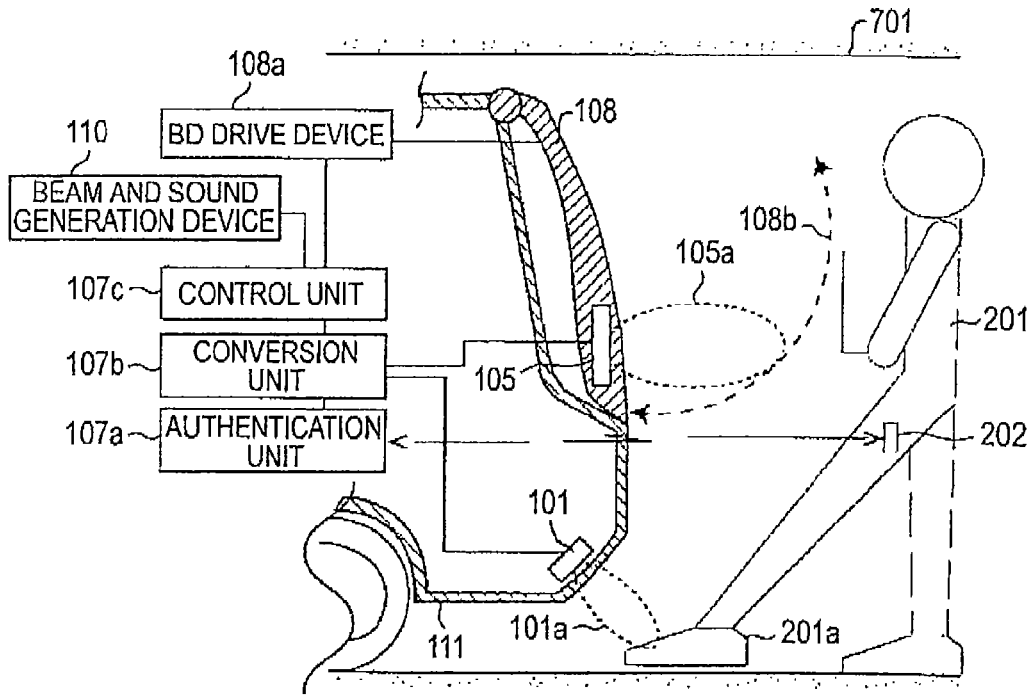
FIGS. 8A and 8B are conceptual views describing the usage of the vehicle door opening and closing apparatus according to a third embodiment of this disclosure.
Figure 8B:
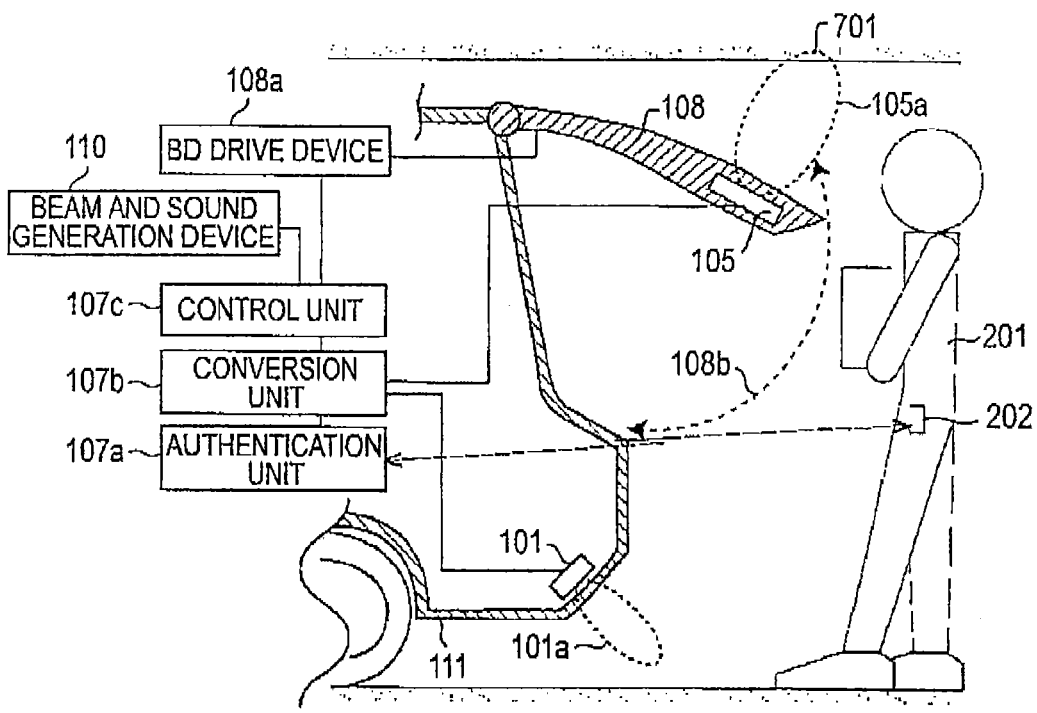

FIGS. 8A and 8B are cross-sectional views taken along line IV-IV in FIG. 1, conceptually describing as to how the user 201 uses the vehicle door opening and closing apparatus 100. The fifth electrostatic sensor 105 is installed in the back door 108. A sensing region 105a of the fifth electrostatic sensor 105 is oriented to the outside of the vehicle 1, and is positioned at a height at which the fifth electrostatic sensor 105 can detect the body of the user 201. The fifth electrostatic sensor 105 is mainly used so as to confirm that the body of the user 201 does not stand in the opening and closing trajectory 108b of the back door 108. That is, the fact that the user 201 is not detected by the fifth electrostatic sensor 105 indicates that the user 201 does not stand in the opening and closing trajectory 108b of the back door 108, and thus the safety of the user 201 is ensured. The fifth electrostatic sensor 105 is mainly used so as to detect an obstacle 701 in such a manner that the back door 108 is prevented from colliding with the obstacle (ceiling) 701. There is no limitation to the maximum distance of the sensing region 105a of the fifth electrostatic sensor 105, but the sensing region 105a may have the maximum distance of 10 cm to 1 m. Since the body of the user 201 is relatively lager than the foot portion 201a, an area (S) of the fifth electrostatic sensor 105 may be larger than the area (S) of the first electrostatic sensor 101.

Relationships in size, orientation and position between the respective sensing regions 101a and 105a of the first and fifth electrostatic sensors 101 and 105 are designed in advance based on the opening and closing trajectory 108b of the back door 108, or physical features (for example, the average height of adults) of a typical user. For example, the sizes, orientations and positions of the respective sensing regions 101a and 105a of the first and fifth electrostatic sensors 101 and 105 are adjusted in such a manner that the first electrostatic sensor 101 detects the foot portion 201a, and the fifth electrostatic sensor 105 does not detect the user 201 when the user 201 standing out of the opening and closing trajectory 108b of the back door 108 puts the foot portion 201a toward the first electrostatic sensor 101. The size, orientation, and position may be appropriately adjusted based on a preference of the user 201.

Operation

The operations of the configuration elements of the vehicle door opening and closing apparatus 100 according to the embodiment will be described. The control unit 107c monitors the fifth electrostatic sensor 105, and confirms that the user 201 is not detected by the fifth electrostatic sensor 105, in other words, that the user 201 does not stand in the sensing region 105a. When the user 201 is detected by the fifth electrostatic sensor 105, the control unit 107c may output a control signal to the beam and sound generation device 110. In addition, the beam and sound generation device 110 may generate light or sound, and encourage the user 201 to separate from the vehicle 1. When the fifth electrostatic sensor 105 detects the obstacle 701 during the opening drive of the back door 108, the control unit 107c outputs a drive stop signal to the BD drive apparatus 108a, and the BD drive apparatus 108a stops the opening drive of the back door 108 (refer to FIG. 8B).

Figure 9:
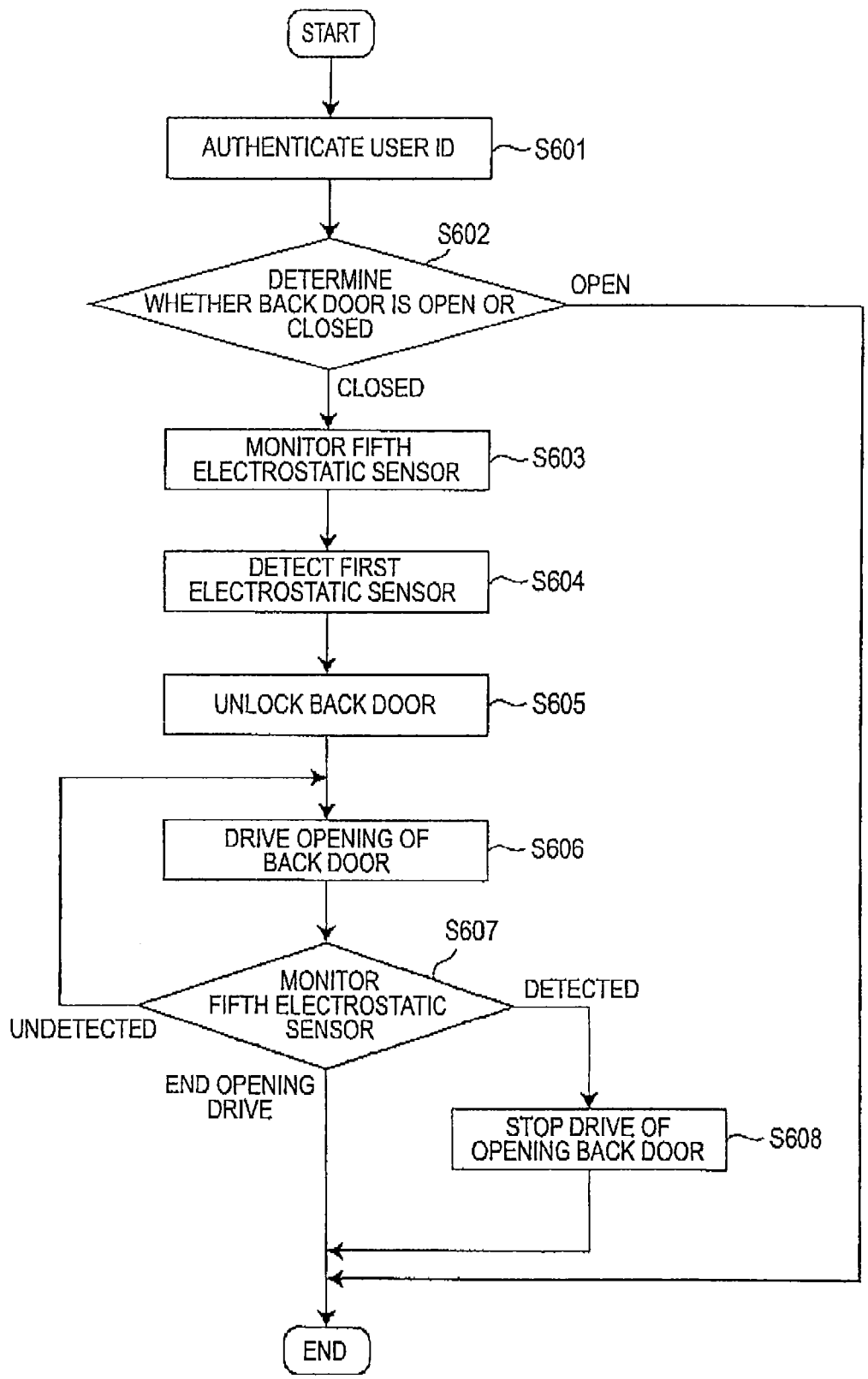
FIG. 9 is a control flow chart of the control device according to the third embodiment of this disclosure.

FIG. 9 is a flow chart describing controls performed by the control device 107 of the vehicle door opening and closing apparatus 100.

Step 601: the authentication unit 107a communicates with the ID key 202 via the antenna, and authenticates that the user 201 is a user of the vehicle 1 based on a signal from the ID key 202 (success of authentication).

Step S602: the control unit 107c monitors the BD opening and closing apparatus 108a, and determines whether the back door 108 is open or closed. When the back door 108 is open, the operation of the vehicle door opening and closing apparatus 100 does not close the back door 108 in light of safety, and the vehicle door opening and closing apparatus 100 stops its operation. When the vehicle door opening and closing apparatus 100 includes the second electrostatic sensor 102, the vehicle door opening and closing apparatus 100 may close the back door 108.

Step S603: when the back door 108 is closed, the conversion unit 107b monitors the fifth electrostatic sensor 105, and confirms that the user 201 is not detected by the fifth electrostatic sensor 105.

Step S604: the conversion unit 107b converts a detection signal from the first electrostatic sensor 101, and the conversion unit 107b inputs the converted detection signal to the control unit 107c.

Step S605: the control unit 107c outputs a drive signal to the BD drive apparatus 108a, and the BD drive apparatus 108a unlocks the back door 108 based on the drive signal.

Step S606: the control unit 107c outputs a drive signal to the BD drive apparatus 108a, and the BD drive apparatus 108a performs an opening drive on the back door 108 based on the drive signal.

Step S607: the control unit 107c monitors the fifth electrostatic sensor 105. When the user 201 is not detected by the fifth electrostatic sensor 105, step S606 is repeatedly performed. When the opening drive of the back door 108 ends, the operation of the vehicle door opening and closing apparatus 100 ends.

Step S608: when the fifth electrostatic sensor 105 detects the ceiling 701, the control unit 107c outputs a drive stop signal to the BD drive apparatus 108a. The BD drive apparatus 108a stops the opening drive of the back door 108 based on the drive stop signal, and the operation of the vehicle door opening and closing apparatus 100 ends.

The vehicle door opening and closing apparatus according to the embodiment performs an opening drive or a closing drive on the vehicle door when the first electrostatic sensor detects the foot portion of the user, and thus it is possible to improve user-friendliness relative to the opening and closing of the vehicle door. Furthermore, the vehicle door opening and closing apparatus according to the embodiment monitors the fifth electrostatic sensor, and demands that the user stand out of the opening and closing trajectory of the back door, and thus it is possible to ensure the safety of the user, and to prevent the back door from colliding with the obstacle.

Fourth Embodiment

Figure 10:
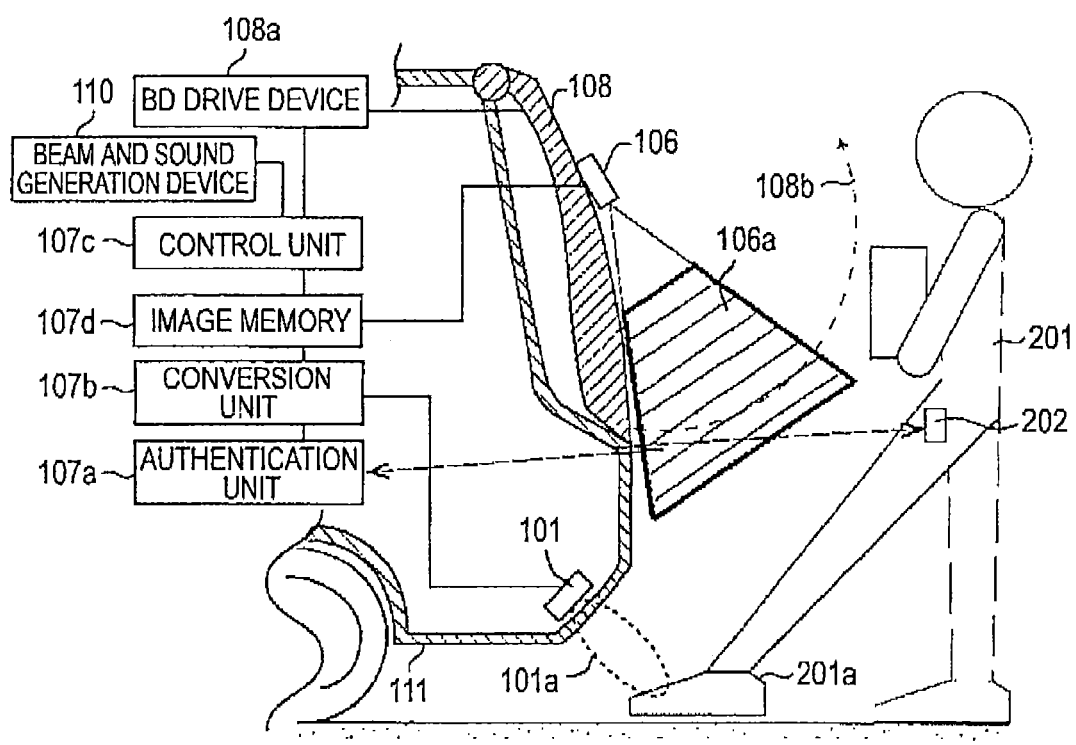
FIG. 10 is a conceptual view describing the usage of the vehicle door opening and closing apparatus according to a fourth embodiment of this disclosure.

In a fourth embodiment of the present invention, the vehicle door opening and closing apparatus 100 includes the sixth sensor 106 which is a second detector installed in the back door 108. The sixth sensor 106 detects the user 201 in a predetermined range 106a from the back door 108 (refer to FIG. 10). When the sixth sensor 106 is a digital camera, image data acquired by the sixth sensor 106 is stored on the image memory 107d of the control device 107, and the control unit 107c processes the image data. The control unit 107c controls the functions of the beam and sound generation device 110 and the BD drive apparatus 108*a* based on the processed results. The sixth sensor 106 may be installed in the sliding door 109.

Fifth Embodiment

A fifth embodiment of this disclosure relates to the vehicle door opening and closing apparatus that automatically opens and closes the back door when the user approaches the back door of the vehicle, and holds up the foot portion over the electrostatic sensor installed in the rear bumper.

Configuration

Figure 11:
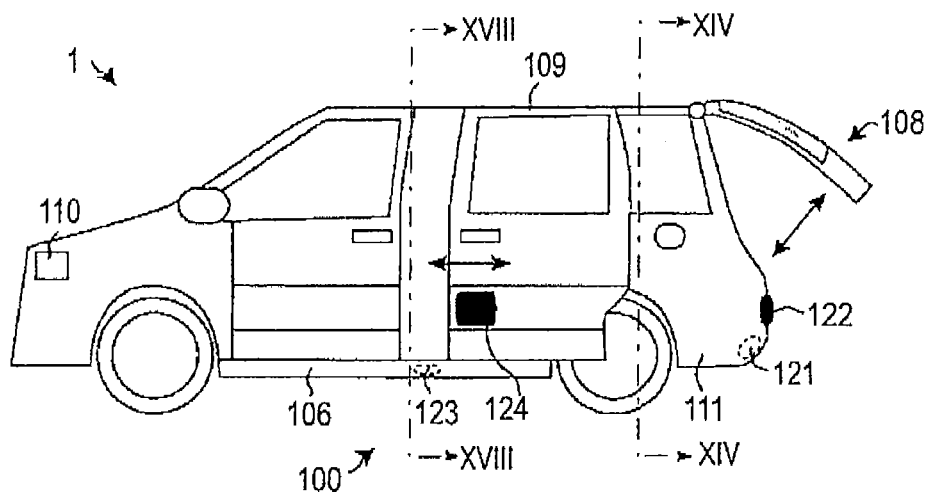
FIG. 11 is a schematic view of the vehicle according to a fifth embodiment of this disclosure when seen from the side.
Figure 12:
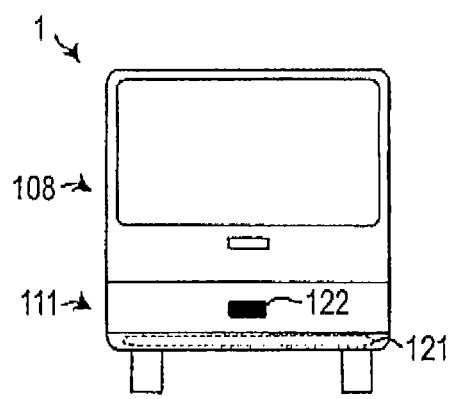
FIG. 12 is a schematic view of the vehicle according to the fifth embodiment of this disclosure when seen from the back.

The configuration elements of the vehicle door opening and closing apparatus according to the embodiment, and the functions of the configuration elements will be described. FIGS. 11 and 12 are a side schematic view and a rear schematic view of a vehicle 1 equipped with the vehicle door opening and closing apparatus 100 according to the fifth embodiment of the present invention, respectively. FIG. 13 is a block diagram of the vehicle door opening and closing apparatus 100.

As illustrated in FIG. 13, the vehicle door opening and closing apparatus 100 according to the embodiment includes a first electrostatic sensor 121 which is a first detector; a second sensor 122 which is a second detector; and the control device 107. The vehicle door opening and closing apparatus 100 according to the embodiment may include a third electrostatic sensor 123 and a fourth sensor 124. That is, this disclosure is not limited to the configuration in which the vehicle door opening and closing apparatus 100 according to the embodiment includes all of the first and third electrostatic sensors 121 to 123, and the second and fourth sensors 122 and 124. This disclosure may also have various configurations in other embodiments.

Each of the first and third electrostatic sensors 121 to 123 contains sensor electrodes, and may be a passive electrostatic sensor that detects a change in electrostatic capacity between the sensor electrodes and the detection target, or may be an active electrostatic sensor that generates an electric field between the sensor electrodes, and detects a change in electric field resulting from the detection target. The first and third electrostatic sensors 121 and 123 have respective sensing regions 121*a* and 123*a*, each of which is located in a predetermined range from the sensor electrodes (refer to FIGS. 14A and 14B). Here, the sensing region indicates a range in which the sensor can detect the detection target. It is possible to adjust the sizes of the sensing regions 121*a* to 123*a* by adjusting the areas of the respective sensor electrodes, based on a formula $C=\epsilon S/d$ (C: electrostatic capacity, $\epsilon$: permittivity, S: area of electrode, d: distance between electrodes). The first and third electrostatic sensors 121 to 123 can measure a distance between the detection target and each of the respective sensor electrodes based on a change in capacity of the first electrostatic sensor 121 and the third electrostatic sensor 123. Since the first and third electrostatic sensors 121 to 123 can detect the detection target which is located in the vicinity of poles (portions in contact with the sensor electrodes) of the respective sensor electrodes, it is possible to relatively reduce detection errors in the vicinity of the sensor electrodes, and to improve user-friendliness.

Each of the second and fourth sensors 122 and 124 is an optical sensor that detects the detection target by using light, or a radio wave sensor that detects the detection target by using radio waves. The second and fourth sensors 122 and 124 have a predetermined range of sensing regions 122*a* and 124*a*, respectively. The second and fourth sensors 122 and 124 measure distances between the sensors 122 and 124 and the detection target in the sensing regions 122*a* and 124*a*, respectively. In addition, the second and fourth sensors 122 and 124 measure a speed of the detection target approaching the sensors 122 and 124. The second and fourth sensors 122 and 124 output the measurement results to the control unit 107*c*.

For example, each of the second and fourth sensors 122 and 124 may be a laser Doppler velocimeter. Each of the second and fourth sensors 122 and 124 measures a distance between the optical sensor itself and the detection target, and a speed of the detection target approaching the optical sensor by radiating light to the detection target, and measuring the strength of the light reflected from the detection target or a time period until each of the sensors 122 and 124 receives the light. The radio sensor used as the second and fourth sensors 122 and 124 may be a Doppler radar. Each of the second and fourth sensors 122 and 124 measures a distance between the radio wave sensor itself and the detection target, and a speed of the detection target approaching the radio wave sensor by measuring a frequency transition resulting from Doppler effects.

The optical sensor or the radio wave sensor may be used as the second and fourth sensor 122 and 124, and thus the second and fourth sensor 122 and 124 are referred to as "the optical sensor or the radio wave sensor". Each of the second and fourth sensors 122 and 124 measures a distance between the sensor itself and the detection target, and a speed of the detection target. The vehicle door opening and closing apparatus 100 determines whether the safety of the detection target can be ensured based on the measured distances, and determines whether the detection target is a human based on the measured speed. That is, the second and fourth sensors 122 and 124 measure a speed of the detection target approaching the sensors 122 and 124, but, do not measure speeds of children and the like running around the sensors 122 and 124. For this reason, the second and fourth sensors 122 and 124 measure a speed of only the detection target approaching the sensors 122 and 124, and thus the second and fourth sensors 122 and 124 can detect a person (that is, the user 201) who attempts to open or close the back door 108.

The control device 107 is a computer including an arithmetic calculation unit and a storage region, and contains the authentication unit 107*a*; the conversion unit 107*b*; the control unit 107*c*. The control device 107 processes signals from the first and third electrostatic sensors 121 and 123, the second and fourth sensors 122 and 124, and the ID key 202. The control device 107 outputs drive signals to the back door (BD) drive device 108*a*, the sliding door (SD) drive device 109*a* based on the processed results, and outputs a control signal to the beam and sound generation device 110 based on the processed results. The BD drive device 108*a* performs an opening drive or a closing drive on the back door 108 of the vehicle 1 based on the drive signal from the control device 107, and the SD drive device 109*a* performs an opening drive or a closing drive on the sliding door 109 of the vehicle 1 based on the drive signal from the control device 107. The beam and sound generation device 110 sends an alarm to the user 201 by generating predetermined light or sound based on the control signal from the control device 107.

The authentication unit 107*a* of the control device 107 receives a signal from the ID key 202 via the antenna (not illustrated), and authenticates that the user 201 in an authentication range 301 of the vehicle 1 is a user of the vehicle 1 (success of authentication). Upon the successful authentication by the authentication unit 107a, the vehicle door opening and closing apparatus 100 may operate.

The conversion unit 107b includes a pre-amplifier, an A/D converter, and the like, and converts a signal indicative of electrostatic capacity output from each of the first and third electrostatic sensors 121 and 123 into a digital data signal or the like.

The control unit 107c processes the signal converted by the conversion unit 107b, and the signals from the second and fourth sensors 122 and 124. The control unit 107c outputs drive signals to the BD drive device 108a and the SD drive device 109a, and outputs a control signal to the beam and sound generation device 110 based on the processed results. The control unit 107c can monitor the first and third electrostatic sensors 121 to 123, and the second and fourth sensors 122 and 124, and can appropriately acquire the detection states and the measurement results of the sensors 121 to 124. Furthermore, the control unit 107c can monitor the BD drive device 108a and the SD drive device 109a, and can determine whether the back door 108 and the sliding door 109 are open or closed.

Figure 14A:
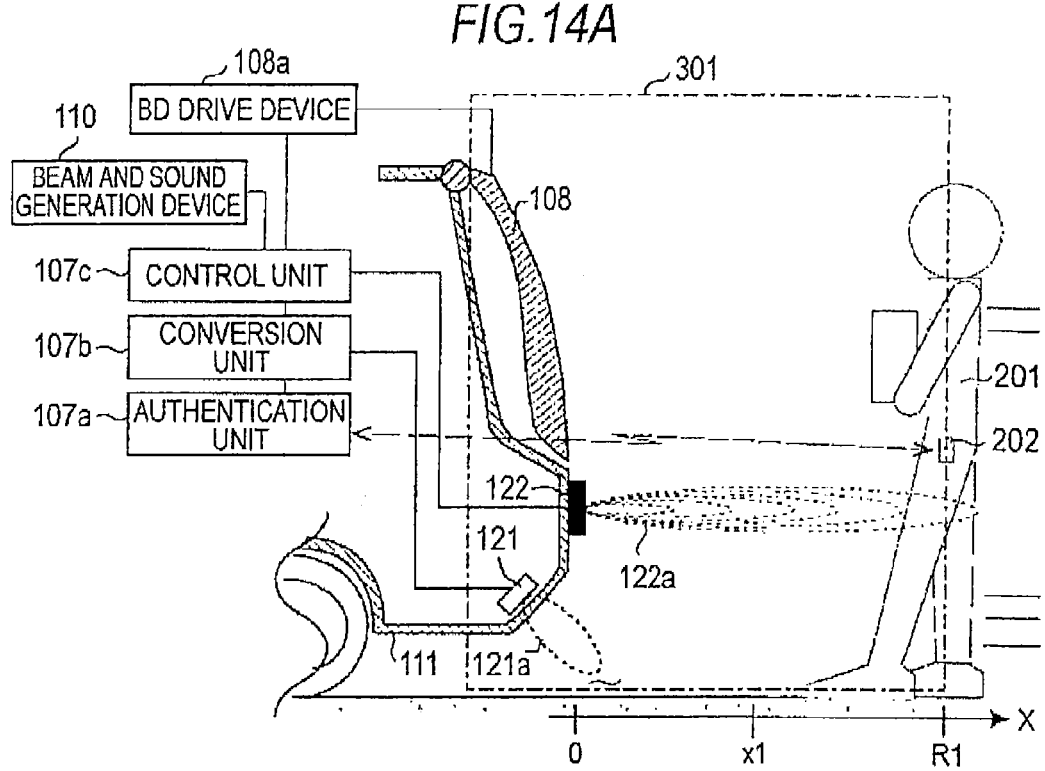
FIGS. 14A and 14B are conceptual views describing the usage of the vehicle door opening and closing apparatus according to the fifth embodiment of this disclosure.
Figure 14B:
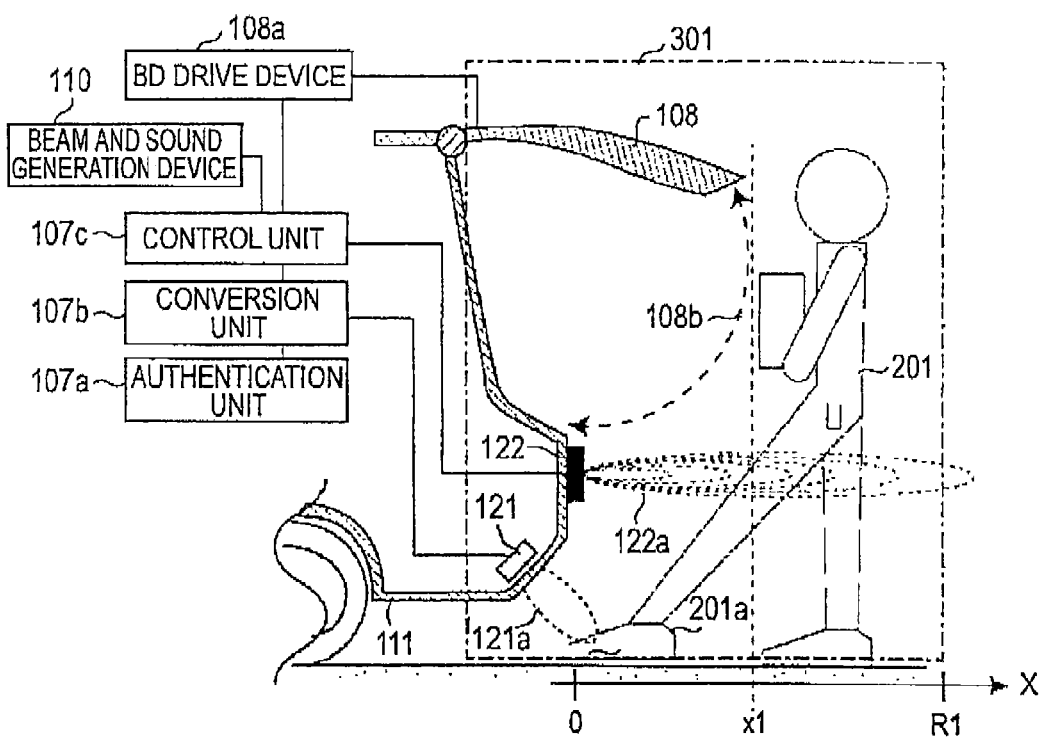
Figure 15:
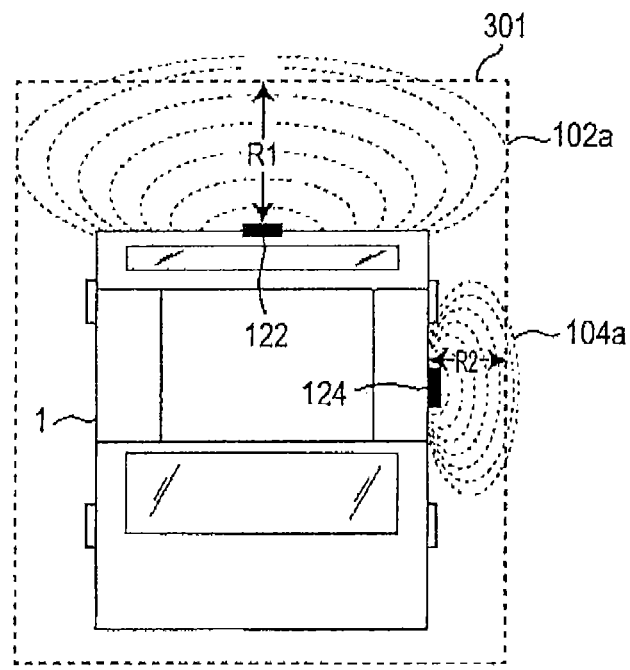
FIG. 15 is a schematic view of the vehicle according to the fifth embodiment of this disclosure when seen from above.

FIG. 14A is a cross-sectional view taken along line XIV-XIV in FIG. 11, conceptually describing as to how the user 201 uses the vehicle door opening and closing apparatus 100. FIG. 15 is a schematic view of the vehicle when seen from above.

As illustrated in FIG. 14A, the first electrostatic sensor 121 is installed in the rear bumper (or the undercover) 111 of the vehicle 1, and a sensing region 121a is oriented to the outside of the vehicle 1 at a predetermined angle with respect to a vertical direction. The first electrostatic sensor 121 is mainly used so as to detect the foot portion 201a of the user 201, and to determine whether the user 201 has an intention of opening or closing of the back door 108 (refer to FIG. 14B). There is no limitation to the maximum distance of the sensing region 121a of the first electrostatic sensor 121, but the sensing region 121a may have the maximum distance of 10 cm to 20 cm. Typically, unlike a sensing region obtainable by using light or radio waves, the sensing region of the electrostatic sensor is almost not affected by a resin material, and thus the first electrostatic sensor 121 can be installed in the resin-made rear bumper 111 as in the embodiment. Compared to the configuration of the related art in which the radio wave sensor is installed in an exposed manner in a concave portion formed in the rear bumper, in the configuration of the embodiment in which the first electrostatic sensor 121 is installed in the rear bumper 111, it is possible to reduce sensing performance degradation resulting from a build-up of dirt or dust, and to provide a good design.

The second sensor 122 is positioned above the first electrostatic sensor 121, and is installed in an exterior portion of the rear bumper 111, preferably installed in the vicinity of the center of the rear bumper 111 in a horizontal direction (refer to FIG. 12). The installation position of the second sensor 122 is not limited to the rear bumper 111, and may be installed in the back door 108. The sensing region 122a of the second sensor 122 is oriented to the outside of the vehicle 1, and includes the authentication range (a distance R1) 301 in the back of the vehicle 1 (refer to FIG. 15). Here, the second sensor 122 may be installed at a height (for example, 1 m above the ground or higher) higher than or equal to those of children or small animals, and the sensing region 122a of the second sensor 122 may be designed to be widen in the horizontal direction in such a manner that the second sensor 122 does not detect the children or the small animals.

A size and orientation of the sensing region 121a of the first electrostatic sensor 121 are designed in advance based on the opening and closing trajectory 108b (a trajectory which is drawn by the end of the back door 108 when the back door 108 is opened and closed) of the back door 108, or physical features (for example, the average height of adults) of a typical user. For example, the size and orientation of the sensing region 121a of the first electrostatic sensor 121 are adjusted in such a manner that the first electrostatic sensor 121 detects the foot portion 201a when the typical user standing out of the opening and closing trajectory 108b of the back door 108 puts the foot portion 201a toward the first electrostatic sensor 121. The size and orientation of the sensing region 121a of the first electrostatic sensor 121 may be appropriately adjustable based on a preference of the user 201.

Operation

The operations of the configuration elements of the vehicle door opening and closing apparatus 100 according to the embodiment will be described. When the ID key 202 enters the authentication range (the distance R1) 301 of the vehicle 1, the authentication unit 107a of the control device 107 communicates with the ID key 202 via the antenna. The authentication unit 107a authenticates that the user 201 is a user of the vehicle 1 based on a signal from the ID key 202 (success of authentication). At this time, the control unit 107c outputs a control signal to the beam and sound generation device 110. The beam and sound generation device 110 may generate light or sound, and notify the user that the authentication is successful. Upon the successful authentication by the authentication unit 107a, the vehicle door opening and closing apparatus 100 may operate. When the back door 108 is driven to be closed, this authentication process may be omitted.

The control unit 107c monitors the second sensor 122, and the second sensor 122 inputs a distance x between the sensor 122 and the detection target, and a speed v of the detection target approaching the sensor 122 to the control unit 107c at predetermined time intervals (for example, at time intervals of a few milliseconds). The control unit 107c determines whether the detection target stands in the opening and closing trajectory 108b of the back door 108 based on the distance x between the sensor 122 and the detection target. For example, as illustrated in FIG. 14A, when the distance x between the second sensor 122 and the detection target lies in a range of a position (x=0) of the second sensor 122 to a safety distance x1 of the back door 108, the control unit 107c determines that the detection target (that is, the user 201) stands in the opening and closing trajectory 108b of the back door 108, and the safety of the detection target is not ensured. Here, the safety distance x1 of the back door 108 is a distance indicating that when the detection target (that is, the user 201) separates the safety distance x1 from the second sensor 122, the detection target does not stand in the opening and closing trajectory 108b of the back door 108.

In contrast, when the distance x between the second sensor 122 and the detection target does not lie in a range (0≤x<x1) of the position (x=0) of the second sensor 122 to the safety distance x1 (that is, x1≤x), the control unit 107c determines that the detection target does not stand in the opening and closing trajectory 108b of the back door 108, and the safety of the detection target is ensured.

When the speed v of the detection target is lower than or equal to a predetermined speed vth (for example, a human walking speed: a few m/s, specifically, 1 to 3 m/s), the control unit 107c determines that the detection target is a human. The predetermined speed vth may be appropriately adjustable based on a preference of the user 201.

Figure 16:
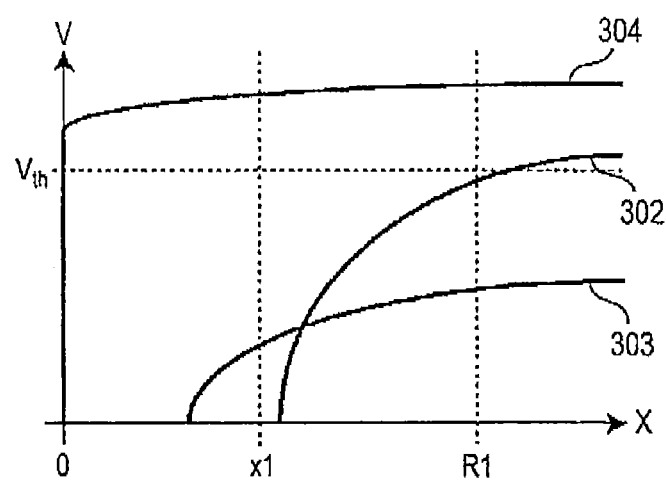
FIG. 16 is an exemplary graph illustrating a relationship between a distance x and a speed v.

FIG. 16 is an exemplary graph illustrating a relationship between the distance x between the second sensor 122 and the detection target, and the speed v of the detection target approaching the sensor 122.

In case 302, the detection target approaches the second sensor 122 (or the back door 108) at a speed lower than or equal to the predetermined speed vth, and the detection target may stop before the detection target enters the range of the safety distance x1. In the case 302, the control unit 107c determines that the detection target is a human, and determines that the detection target does not stand in the opening and closing trajectory 108b of the back door 108.

In case 303, the detection target approaches the second sensor 122 (or the back door 108) at a speed lower than or equal to the predetermined speed vth, and the detection target enters the range of the safety distance x1, and then stops in the range. In the case 303, the control unit 107c determines that the detection target is a human, and determines that the detection target stands in the opening and closing trajectory 108b of the back door 108.

In case 304, the detection target approaches the second sensor 122 (or the back door 108) at a speed higher than or equal to the predetermined speed vth, and the detection target stops at the position (x=0) of the second sensor 122. For example, this is a case in which small animals, luggage, or other objects stop after forcefully colliding with the rear bumper 111. In the case 304, the control unit 107c determines that the detection target is not a human, and determines that the detection target stands in the opening and closing trajectory 108b of the back door 108.

Thereafter, when the user 201 puts the foot portion 201a in the sensing region 121a of the first electrostatic sensor 121, the first electrostatic sensor 121 detects the foot portion 201a, and outputs a detection signal to the conversion unit 107b. At this time, a detecting operation of the first electrostatic sensor 121 may start (be triggered), when the user 201 puts the foot portion 201a in the sensing region 121a for a few seconds, or the user 201 puts the foot portion 201a in and out of the sensing region 121a in multiple times. In this manner, it becomes apparently determined that the user 201 has an intention of opening or closing the back door 108.

In a state where the control unit 107c determines that the detection target does not stand in the opening and closing trajectory 108b, and determines that the detection target is a human (for example, the case 302), when the converted detection signal (that is, an intention of opening or closing the door) is input from the conversion unit 107b, the control unit 107c outputs a drive signal for an opening drive or a closing drive to the BD drive apparatus 108a. The BD drive apparatus 108a performs an opening drive or a closing drive on the back door 108 based on the drivel signal. In contrast, when the control unit 107c determines that the detection target stands in the opening and closing trajectory 108b, or determines that the detection target is not a human (for example, the case 303 and the case 304), the control unit 107c outputs a control signal to the beam and sound generation device 110. The beam and sound generation device 110 generates light or sound based on the control signal, and encourages the detection target (the user) to separate from the vehicle 1.

Figure 17:
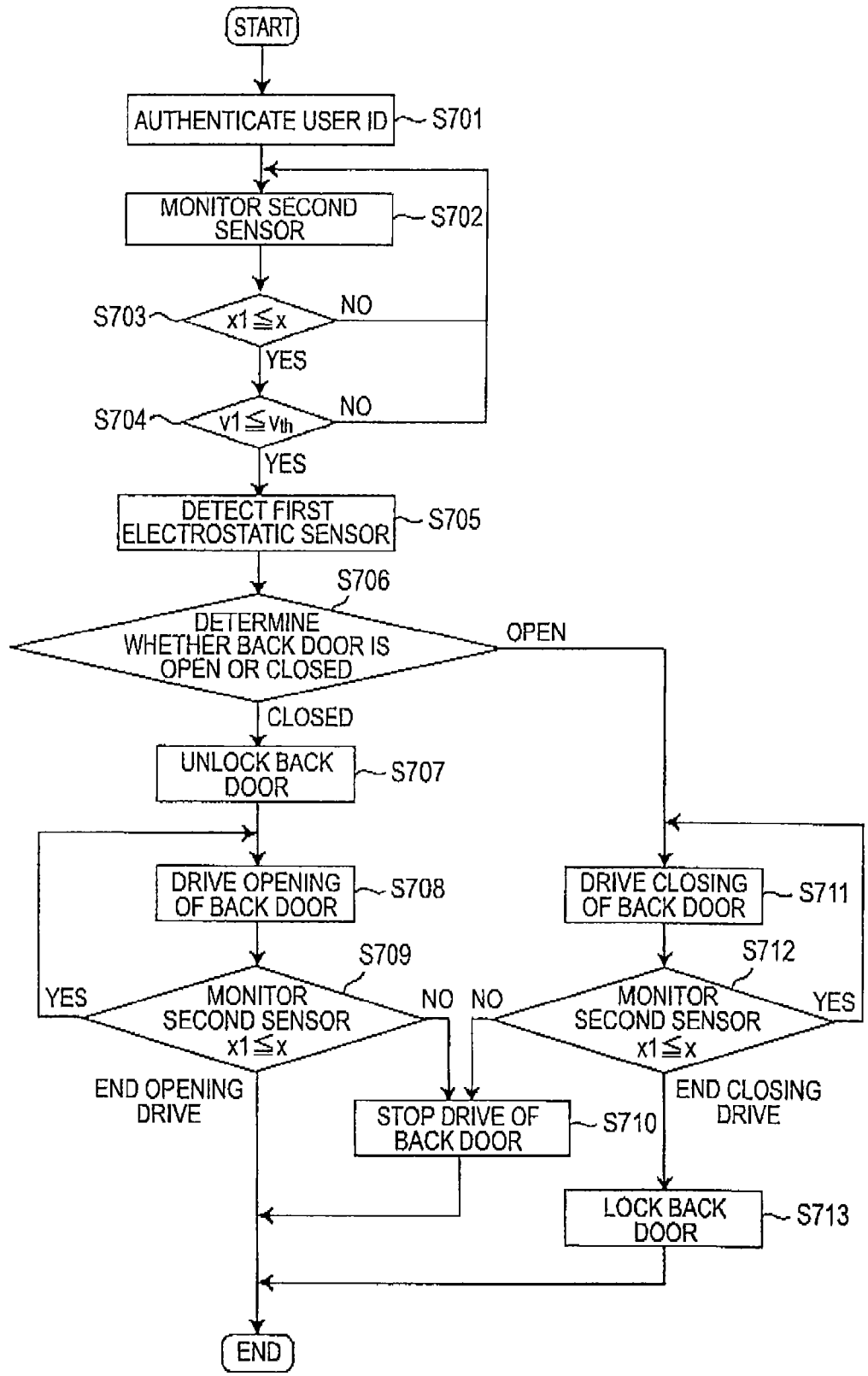
FIG. 17 is a control flow chart of the control device according to the fifth embodiment of this disclosure.

FIG. 17 is a flow chart describing controls performed by the control device 107 of the vehicle door opening and closing apparatus 100 according to the embodiment.

Step S701: the authentication unit 107a communicates with the ID key 202 via the antenna, and authenticates that the user 201 is a user of the vehicle 1 based on a signal from the ID key 202 (success of authentication). When the back door 108 is already open, step S701 is omitted.

Step S702: the control unit 107c monitors the second sensor 122, and the second sensor 122 outputs the measurement results such as the distance x between the second sensor 122 and the detection target entering the authentication range 301, and the speed v of the detection target approaching the second sensor 122 to the control unit 107c.

Step S703: the control unit 107c monitors whether the distance x is greater than or equal to the safety distance x1, and when the safety distance x1 is smaller than or equal to the distance x, the control unit 107c determines that the safety of the detection target is ensured (YES in step S703).

Step S704: the control unit 107c monitors whether the speed v is lower than or equal to the predetermined speed vth, and when the speed v is lower than or equal to the predetermined speed vth, the control unit 107c determines that the detection target is a human (that is, the user 201) (YES in step S704).

Step S705: when the safety distance x1 is smaller than or equal to the distance x, and the speed v is lower than or equal to the predetermined speed vth, the conversion unit 107b converts the detection signal from the first electrostatic sensor 121, and inputs the converted detection signal to the control unit 107c Step S706: the control unit 107c monitors the BD drive apparatus 108a, and determines whether the back door 108 is open or closed.

Step S707: when the back door 108 is closed, the control unit 107c outputs a drive signal to the BD drive apparatus 108a, and the BD drive apparatus 108a unlocks the back door 108 based on the drive signal.

Step S708: the control unit 107c outputs a drive signal to the BD drive apparatus 108a, and the BD drive apparatus 108a performs an opening drive on the back door 108 based on the drive signal.

Step S709: the control unit 107c monitors the second sensor 122, and monitors whether the distance x between the second sensor 122 and the detection target is greater than or equal to the safety distance x1. When the safety distance x1 is smaller than or equal to the distance x (YES in step S709), step S708 is repeatedly performed. When the opening drive of the back door 108 ends, the operation of the vehicle door opening and closing apparatus 100 ends.

Step S710: when the distance x is smaller than the safety distance x1 (NO in step S709), the safety of the detection target is not ensured, and thus the control unit 107c outputs a drive stop signal to the BD drive apparatus 108a. The BD drive apparatus 108a stops the opening drive of the back door 108 based on the drive stop signal, and the operation of the vehicle door opening and closing apparatus 100 ends.

Step S711: when the back door 108 is already open, the control unit 107c outputs a drive signal to the BD drive apparatus 108a, and the BD drive apparatus 108a performs a closing drive on the back door 108 based on the drive signal.

Step S712: the control unit 107c monitors the second sensor 122, and monitors whether the distance x between the second sensor 122 and the detection target is greater than or equal to the safety distance x1. When the safety distance x1 is smaller than or equal to the distance x (YES in step S712), step S711 is repeatedly performed.

Step S710: when the distance x is smaller than the safety distance x1 (NO in step S712), the safety of the detection target is not ensured, and thus the control unit 107c outputs a drive stop signal to the BD drive apparatus 108a. The BD drive apparatus 108a stops the closing drive of the back door 108 based on the drive stop signal, and the operation of the vehicle door opening and closing apparatus 100 ends.

Step S713: when the closing drive of the back door 108 ends, the control unit 107c outputs a drive signal to the BD drive apparatus 108a, and the BD drive apparatus 108a locks the back door 108 based on the drive signal. The operation of the vehicle door opening and closing apparatus 100 ends.

A sequence of the above-mentioned steps can be appropriately changed depending on its purpose.

The vehicle door opening and closing apparatus according to the embodiment performs an opening drive or a closing drive on the vehicle door when the first electrostatic sensor detects the foot portion of the user, and thus it is possible to clarify whether the user has an intention of opening or closing the back door and to improve user-friendliness. Furthermore, since it is determined whether the detection target does not stand in the opening and closing trajectory of the back door by using the second sensor 122 (that is, an optical sensor or a radio wave sensor), the safety of the detection target is ensured. Since it is determined whether the detection target is a human (that is, the user) by using the second sensor 122, it is possible to reduce a degradation in user's safety and user-friendliness resulting from erroneous detection of small animals, luggage, or other objects.

Sixth Embodiment

A sixth embodiment of this disclosure relates to the vehicle door opening and closing apparatus that automatically opens and closes the sliding door when the user approaches the sliding door of the vehicle, and holds up the foot portion over the electrostatic sensor installed in the side bumper (or the aero part, or the sill cover).
Configuration The configuration elements of the vehicle door opening and closing apparatus 100 according to the embodiment, and the functions of the configuration elements will be described. The vehicle door opening and closing apparatus 100 according to the embodiment includes a third electrostatic sensor 123 which is a first detector; a fourth sensor 124 which is a second detector; and the control device 107. The vehicle door opening and closing apparatus 100 according to the embodiment may also include the first electrostatic sensor 121 and the second sensor 122.

FIGS. 18A and 18B are cross-sectional views taken along line XVIII-XVIII in FIG. 11, conceptually describing as to how the user 201 uses the vehicle door opening and closing apparatus 100.

The third electrostatic sensor 123 is installed in the side bumper (or the aero part, or the sill cover) 112 of the vehicle 1, and a sensing region 123a is oriented to the outside of the vehicle 1 at a predetermined angle with respect to the vertical direction. The third electrostatic sensor 123 is mainly used so as to detect the foot portion 201a of the user 201, and to determine whether the user 201 has an intention of opening or closing the sliding door 109. There is no limitation to the maximum distance of the sensing region 123a of the third electrostatic sensor 123, but the sensing region 123a may have the maximum distance of 10 cm to 20 cm. Typically, unlike a sensing region obtainable by using light or radio waves, the sensing region of the electrostatic sensor is almost not affected by a resin material, and thus the third electrostatic sensor 123 can be installed in the resin-made side bumper as described in the embodiment. Compared to the configuration of the related art in which the radio wave sensor is installed in an exposed manner in a concave portion formed in the side bumper, in the configuration of the embodiment in which the third electrostatic sensor 123 is installed in the side bumper 112, it is possible to reduce sensing performance degradation resulting from a build-up of dirt or dust, and to provide a good design.

The fourth sensor 124 is positioned above the third electrostatic sensor 123, and is installed in an exterior portion of the sliding door 109 (or side molding). A sensing region 124a of the fourth sensor 124 is oriented to the outside of the vehicle 1, and is includes the authentication range (a distance R2) 301 formed beside the vehicle 1 (refer to FIG. 15). Here, the fourth sensor 124 may be installed at a height (for example, 1 m above the ground) higher than or equal to those of children or small animals, and the sensing region 124a of the fourth sensor 124 may be designed to be widen in the horizontal direction in such a manner that the fourth sensor 124 does not detect the children or the small animals.

A size and orientation of the sensing region 123a of the third electrostatic sensor 123 are adjusted in advance based on an opening and closing trajectory of the sliding door 109, or physical features (for example, the average height of adults) of a typical user. Here, the opening and closing trajectory of the sliding door 109 indicates a range in which the user may be caught in the sliding door 109, and when the user 201 stands in the opening and closing trajectory of the sliding door 109 during the opening and closing of the sliding door 109, the user 201 may be caught in the sliding door 109. For example, the size and orientation of the sensing region 123a of the third electrostatic sensor 123 are designed in such a manner that the third electrostatic sensor 123 detects the foot portion 201a when the user 201 standing out of the opening and closing trajectory of the sliding door 109 puts the foot portion 201a toward the third electrostatic sensor 123 (refer to FIG. 18B). The size and orientation of the sensing region 123a may be appropriately changeable based on a preference of the user 201.
Operation The operations of the configuration elements of the vehicle door opening and closing apparatus 100 according to the embodiment will be described. The control unit 107c monitors the fourth sensor 124, and the fourth sensor 124 inputs the measurement results such as the distance x between the sensor 124 and the detection target, and the speed v of the detection target approaching the sensor 124 to the control unit 107c at predetermined time intervals (for example, at time intervals of a few milliseconds). The control unit 107c determines whether the detection target stands in the opening and closing trajectory (a range in which the user 201 may be caught in the sliding door 109) of the sliding door 109 based on the distance x between the fourth sensor 124 and the detection target. For example, as illustrated in FIG. 18B, when the detection target (that is, the user 201) stands in a range of a position (x=0) of the fourth sensor 124 to a safety distance x2 of the sliding door 109, the control unit 107c determines that the detection target may be caught in the sliding door 109. Here, the safety distance x2 is a distance indicating that when the detection target (that is, the user 201) separates the safety distance x2 from the fourth sensor 124, the detection target does not stand in the opening and closing trajectory (that is, the range in which the user 201 may be caught in the sliding door 109) of the sliding door 109. For this reason, when the distance x does not lie in the range ($0 \leq x \leq x2$) of the position (x=0) of the fourth sensor 124 to the safety distance x2 (that is, $x2 \leq x$), the control unit 107c determines that the safety of the detection target is ensured. When the speed v of the detection target is lower than or equal to the predetermined speed vth (for example, a human walking speed: 4 to 5 km/h), the control unit 107c determines that the detection target is a human. The predetermined speed vth may be appropriately changeable based on a preference of the user 201.

When the user 201 puts the foot portion 201a in the sensing region 123a of the third electrostatic sensor 123, the third electrostatic sensor 123 detects the foot portion 201a, and outputs a detection signal to the conversion unit 107b. At this time, a detecting operation of the third electrostatic sensor 123 may start (be triggered), when the user 201 puts the foot portion 201a in the sensing region 123a for a few seconds, or the user 201 puts the foot portion 201a in and out of the sensing region 123a in multiple times. In this manner, it becomes apparently determined that the user 201 has an intention of opening or closing the door.

In a case where the control unit 107c determines that the detection target does not stand in the opening and closing trajectory of the sliding door 109, and determines that the detection target is a human, when the converted detection signal (an intention of opening or closing the door) is input from the conversion unit 107b, the control unit 107c outputs a drive signal for an opening drive or a closing drive to the SD drive apparatus 109a. The SD drive apparatus 109a performs an opening drive or a closing drive on the sliding door 109 based on the drive signal. In contrast, when the control unit 107c determines that the detection target stands in the open ng and closing trajectory of the sliding door 109, or determines that the detection target is not a human, the control unit 107c outputs a control signal to the beam and sound generation device 110. The beam and sound generation device 110 generates light or sound based on the control signal, and encourages the detection target (that is, the user 201) to separate from the vehicle 1.

Figure 19:
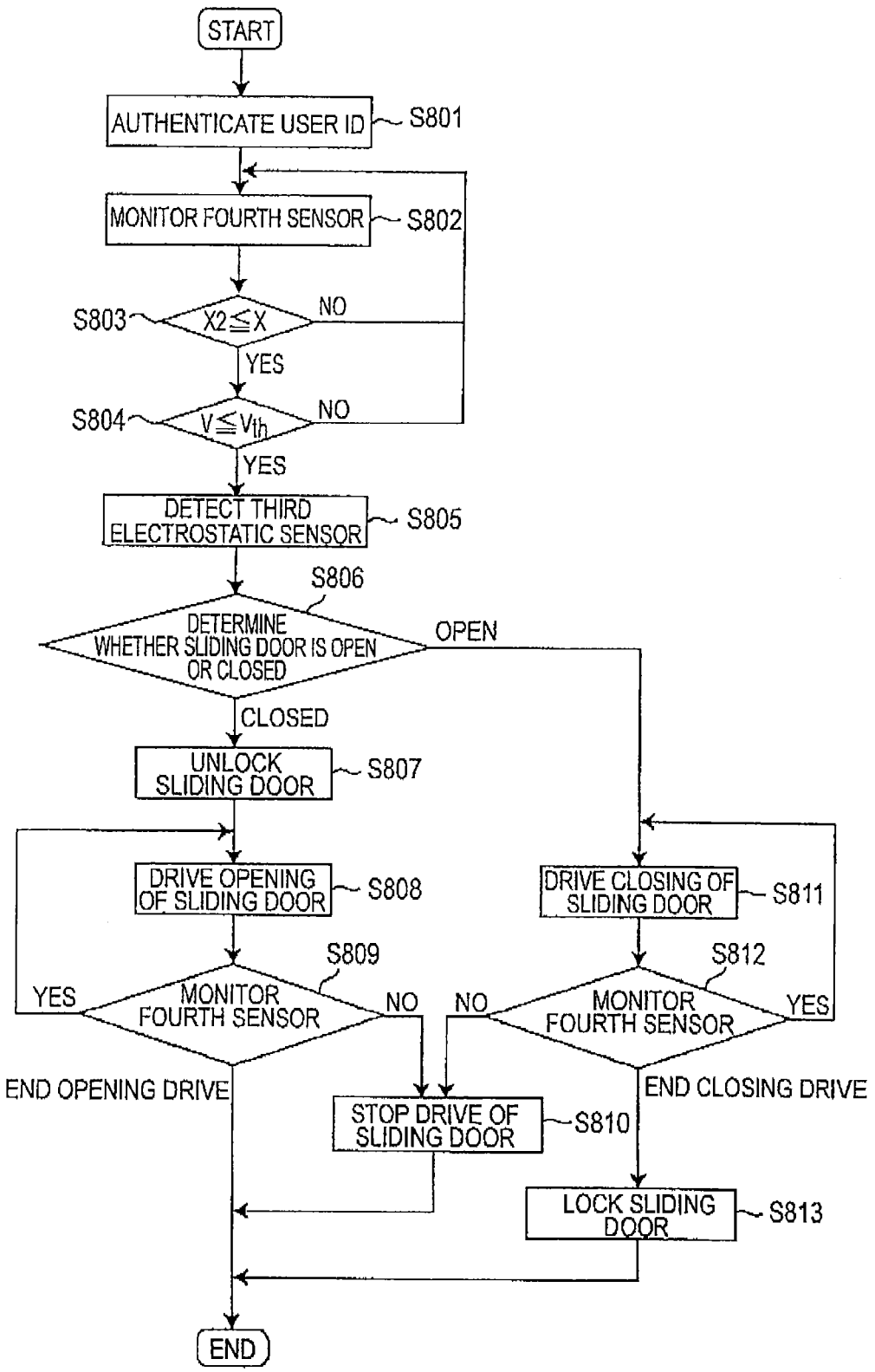
FIG. 19 is a control flow chart of the control device according to the sixth embodiment of this disclosure.

FIG. 19 is a flow chart describing controls performed by the control device 107 of the vehicle door opening and closing apparatus 100 according to the embodiment.

Step S801: the authentication unit 107a communicates with the ID key 202 via the antenna (not illustrated), and authenticates that the user 201 is a user of the vehicle 1 based on a signal from the ID key 202 (success of authentication). When the sliding door 109 is already open, step S801 is omitted.

Step S802: the control unit 107c monitors the fourth sensor 124, and the fourth sensor 124 outputs the measurement results such as the distance x between the fourth sensor 124 and the detection target entering the authentication range (the distance R2) 301, and the speed v of the detection target approaching the fourth sensor 124 to the control unit 107c.

Step S803: the control unit 107c monitors whether the distance x between the fourth sensor 124 and the detection target is greater than or equal to the safety distance x2, and when the safety distance x2 is smaller than or equal to the distance x, the control unit 107c determines that the safety of the detection target is ensured (YES in step S803).

Step S804: the control unit 107c monitors whether the speed v of the detection target is lower than or equal to the predetermined speed vth, and when the speed v is lower than or equal to the predetermined speed vth, the control unit 107c determines that the detection target (that is, the user 201) is a human (YES in step S804).

Step S805: when the safety distance x2 is smaller than or equal to the distance x, and the speed v is lower than or equal to the predetermined speed vth, the conversion unit 107b converts the detection signal from the third electrostatic sensor 123, and inputs the converted detection signal to the control unit 107c.

Step S806: the control unit 107c monitors the SD drive apparatus 109a, and determines whether the sliding door 109 is open or closed.

Step S807: when the sliding door 109 is closed, the control unit 107c outputs a drive signal to the SD drive apparatus 109a, and the SD drive apparatus 109a unlocks the sliding door 109 based on the drive signal.

Step S808: the control unit 107c outputs a drive signal to the SD drive apparatus 109a, and the SD drive apparatus 109a performs an opening drive on the sliding door 109 based on the drive signal.

Step S809: the control unit 107c monitors the fourth sensor 124, and monitors whether the distance x between the fourth sensor 124 and the detection target is greater than or equal to the safety distance x2. When the safety distance x2 is smaller than or equal to the distance x (YES in step S809), step S808 is repeatedly performed. When the opening drive of the sliding door 109 ends, the operation of the vehicle door opening and closing apparatus 100 ends.

Step S810: when the distance x is smaller than the safety distance x2 (NO in step S809), the safety of the detection target is not ensured, and thus the control unit 107c outputs a drive stop signal to the SD drive apparatus 109a. The SD drive apparatus 109a stops the opening drive of the sliding door 109 based on the drive stop signal, and the operation of the vehicle door opening and closing apparatus 100 ends.

Step S811: when the sliding door 109 is open, the control unit 107c outputs a drive signal to the SD drive apparatus 109a, and the SD drive apparatus 109a performs a closing drive on the sliding door 109 based on the drive signal.

Step S812: the control unit 107c monitors the fourth sensor 124, and monitors whether the distance x between the fourth sensor 124 and the detection target is greater than or equal to the safety distance x2. When the safety distance x2 is smaller than or equal to the distance x (YES in step S812), step S811 is repeatedly performed.

Step S810: when the distance x is smaller than the safety distance x2 (NO in step S812), the safety of the detection target is not ensured, and thus the control unit 107c outputs a drive stop signal to the SD drive apparatus 109a. The SD drive apparatus 109a stops the closing drive of the sliding door 109 based on the drive stop signal, and the operation of the vehicle door opening and closing apparatus 100 ends.

Step S813: when the closing drive of the sliding door 109 ends, the control unit 107c outputs a drive signal to the SD drive apparatus 109a, and the SD drive apparatus 109a locks the sliding door 109 based on the drive signal. The operation of the vehicle door opening and closing apparatus 100 ends.

A sequence of the above-mentioned steps can be appropriately changed depending on its purpose.

The vehicle door opening and closing apparatus according to the embodiment performs an opening drive or a closing drive on the vehicle door when the third electrostatic sensor detects the foot portion of the user, and thus it is possible to clarify whether the user has an intention of opening or closing the sliding door and to improve user-friendliness. Furthermore, since it is determined whether the detection target does not stand in the opening and closing trajectory (the range in which the user may be caught in the sliding door) of the sliding door by using the fourth sensor (that is, an optical sensor or a radio wave sensor), the safety of the detection target (the user) is ensured. Since it is determined whether the detection target is a human by using the fourth sensor, it is possible to reduce a degradation in safety of the detection target (the user) and user-friendliness resulting from erroneous detection of small animals, luggage, or other objects.

Seventh Embodiment

In a seventh embodiment of the present invention, an imaging device such as a digital camera is used as the second and fourth sensors 122 and 124, and captures a video of the detection target. The control unit 107c receives image data from the imaging device, and calculates a distance between the imaging device and the detection target, and a speed of the detection target approaching the imaging device by using a well-known image processing technique. The control unit 107c determines whether the detection target stands in a predetermined range from the vehicle door based on the calculated distance, and determines whether the detection target is a human based on the calculated speed. As described above in detail, the control unit 107c controls an opening drive and a closing drive of the vehicle door based on the determination results.

Eighth Embodiment

Figure 20:
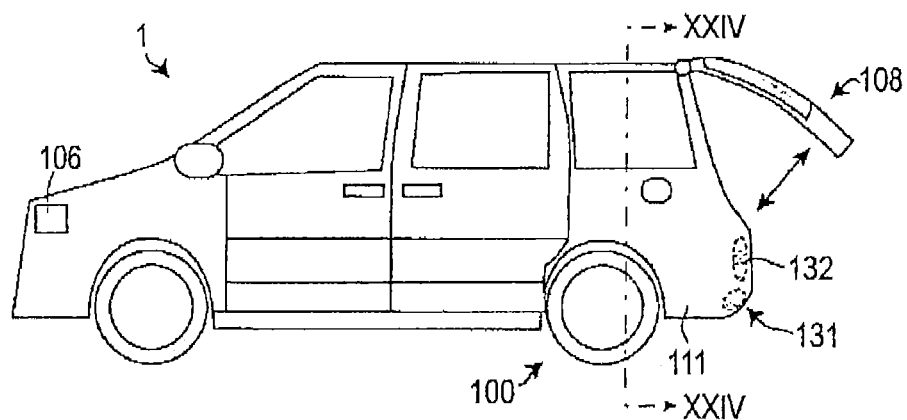
FIG. 20 is a schematic view of the vehicle according to an eighth embodiment of this disclosure when seen from the side.
Figure 21:
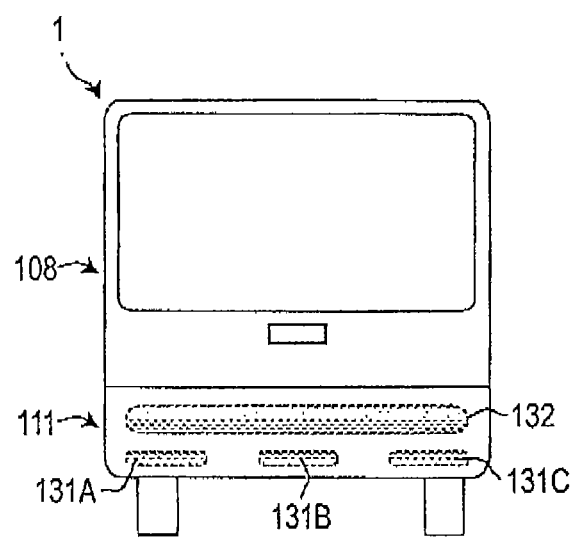
FIG. 21 is a schematic view of the vehicle according to the eighth embodiment of this disclosure when seen from the back.
Figure 22:
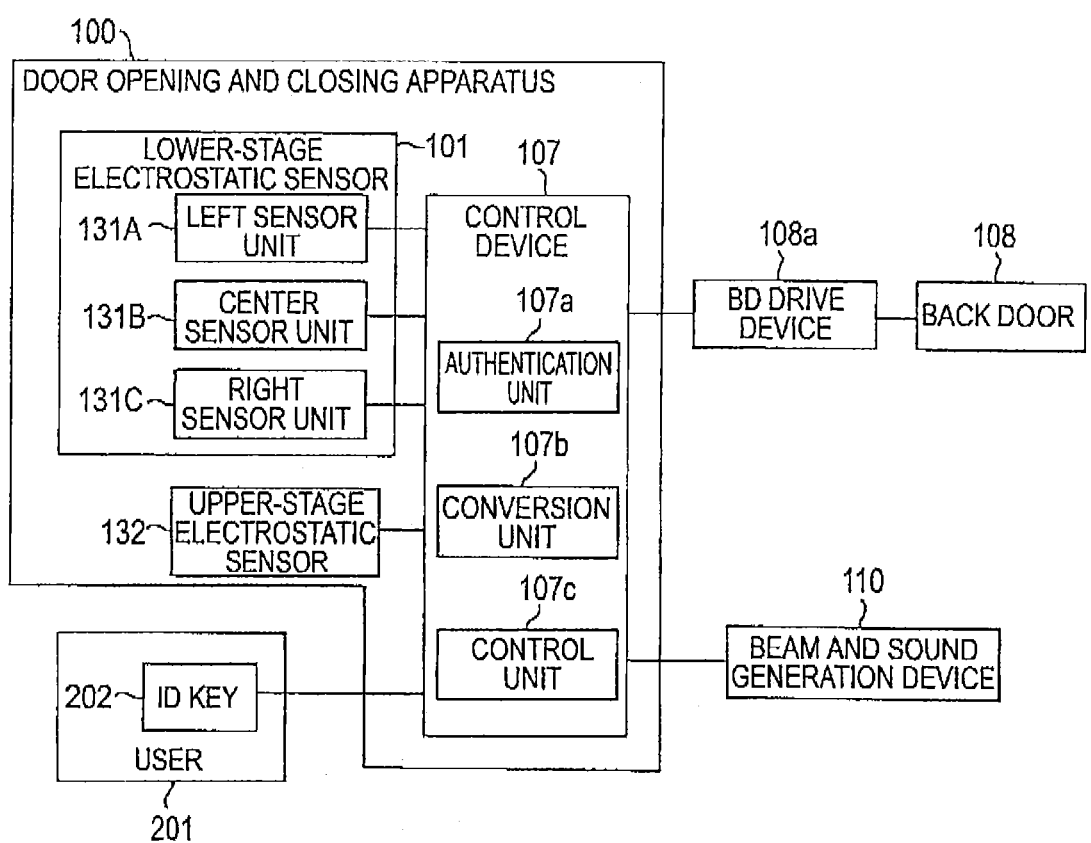
FIG. 22 is a block diagram of the vehicle door opening and closing apparatus according to the eighth embodiment of this disclosure.

A eighth embodiment of this disclosure relates to the vehicle door opening and closing apparatus that automatically opens and closes the back door when the user approaches the back door (the vehicle door which the user intends to open) of the vehicle, and holds up the foot portion and the body over an upper stage and a lower stage electrostatic sensors installed in the rear bumper.
Configuration The configuration elements of the vehicle door opening and closing apparatus according to the embodiment, and the functions of the configuration elements will be described. FIGS. 20 and 21 are a side schematic view and a rear schematic view of the vehicle 1 equipped with the vehicle door opening and closing apparatus 100 according to the embodiment, respectively. FIG. 22 is a block diagram of the vehicle door opening and closing apparatus 100 according to the embodiment.

As illustrated in FIG. 22, the vehicle door opening and closing apparatus 100 according to the embodiment includes a lower stage electrostatic sensor 131 which is a first detector; an upper stage electrostatic sensor 132 which is a second detector, and the control device 107. The lower stage electrostatic sensor 131 has three sensor units as detection units. The three sensor units are respectively referred to as a left sensor unit 131A, a center sensor unit 131B, and a right sensor unit 131C. The lower stage electrostatic sensor 131 may have configurations other than the configuration in which the lower stage electrostatic sensor 131 is provided with three sensor units. The lower stage electrostatic sensor 131 may be provided with at least two of the left sensor unit 131A, the center sensor unit 131B, and the right sensor unit 131C.

Each of the sensor units 131A to 131c of the lower stage electrostatic sensor 131 and the upper stage electrostatic sensor 132 contains sensor electrodes, and may be a passive electrostatic sensor that detects a change in electrostatic capacity between the sensor electrodes and the detection target (the user), or may be an active electrostatic sensor that generates an electric field between the sensor electrodes, and detects a change in electric field resulting from the detection target. The sensor units 131A to 131C of the lower stage electrostatic sensor 131 and the upper stage electrostatic sensor 132 have respective sensing regions 131a to 131c, and 132a, each of which is located in a predetermined range from the sensor electrodes (refer to FIG. 23A). Here, the sensing region indicates a range in which the electrostatic sensor can detect the detection target. It is possible to adjust the sizes of the sensing regions 131a to 131c, and 132a by appropriately adjusting the areas of the respective sensor electrodes, based on a formula $C=\epsilon S/d$ (C: electrostatic capacity, $\epsilon$: permittivity, S: area of electrode, d: distance between electrodes). The sensor units 131A to 131C of the lower stage electrostatic sensor 131, and the upper stage electrostatic sensor 132 can measure a distance between the detection target and each of the respective sensor electrodes, based on a change in capacity thereof. The sensor units 131A to 131C of the lower stage electrostatic sensor 131, and the upper stage electrostatic sensor 132 can also detect the detection target which is located in the vicinity of poles (portions in contact with the sensor electrodes) of the respective sensor electrodes. For this reason, it is possible to reduce detection errors in the vicinity of the sensor electrodes, and to improve user-friendliness.

As illustrated in FIG. 21, the sensor units 131A to 131C of the lower stage electrostatic sensor 131, and the upper stage electrostatic sensor 132 are respectively installed at lower and upper stages in the rear bumper (may be the back door, the under cover, a rear garnish, or the like) 111 of the vehicle 1. The left sensor unit 131A, the center sensor unit 131B, and the right sensor unit 131C are respectively installed on a left side, at the center, and on a right side of the lower stage in the rear bumper 111, and are separated from each other at predetermined intervals. The upper stage electrostatic sensor 132 is installed at the upper stage in the rear bumper 111 across the width of the vehicle 1, and is positioned above the lower stage electrostatic sensor 131. The respective intervals between the left sensor unit 131A, the center sensor unit 131B, and the right sensor unit 131C of the lower stage electrostatic sensor 131 are preferably greater than or equal to the width of the legs of a typical person, and are designed in such a manner that the sensor units 131A to 131C do not detect the same legs of a person standing in front of the back door 108.

Typically, unlike a sensing region obtainable by using light or radio waves, the sensing region of the electrostatic sensor is almost not affected by a resin material, and thus the lower stage electrostatic sensor 131 and the upper stage electrostatic sensor 132 can be installed in the resin-made rear bumper 111 as in the embodiment. Compared to the configuration of the related art in which a radio wave sensor is installed in an exposed manner in a concave portion formed in the rear bumper, in the configuration of the embodiment in which the lower stage electrostatic sensor 131 and the upper stage electrostatic sensor 132 are installed in the rear bumper 111, it is possible to reduce sensing performance degradation resulting from a build-up of dirt or dust, and to provide a good design.

The control device 107 is a computer including an arithmetic calculation unit and a storage region, and contains the authentication unit 107a; the conversion unit 107b; and the control unit 107c. The control device 107 receives and processes signals from the lower stage electrostatic sensor 131, the upper stage electrostatic sensor 132, and the ID key 202. The control device 107 outputs a drive signal to the back door (BD) drive device 108a, and outputs a control signal to the beam and sound generation device 110, based on the processed results. The BD drive device 108a performs an opening drive or a closing drive on the back door 108 of the vehicle 1 based on the drive signal from the control device 107. The beam and sound generation device 110 sends an alarm to the user by generating light or sound based on the control signal from the control device 107.

The authentication unit 107a receives a signal from the ID key 202 via the antenna, and authenticates the user of the vehicle 1 (success of authentication). Upon the successful authentication by the authentication unit 107a, the vehicle door opening and closing apparatus 100 may operate. The conversion unit 107b includes a pre-amplifier, an A/D converter, and the like, and converts a signal indicative of a change in electrostatic capacity output from each of the lower stage electrostatic sensor 131 and the upper stage electrostatic sensor 132 into a digital data signal or the like. The control unit 107c processes the converted signal. The control unit 107c outputs a drive signal and a control signal to the BD drive device 108a and the beam and sound generation device 110, respectively, based on the processed result. The control unit 107c monitors the lower stage electrostatic sensor 131 and the upper stage electrostatic sensor 132, and appropriately determines whether the lower stage electrostatic sensor 131 and the upper stage electrostatic sensor 132 detect the detection target. Furthermore, the control unit 107c monitors the BD drive device 108a, and determines whether the back door 108 is open or closed.

Figure 23A:
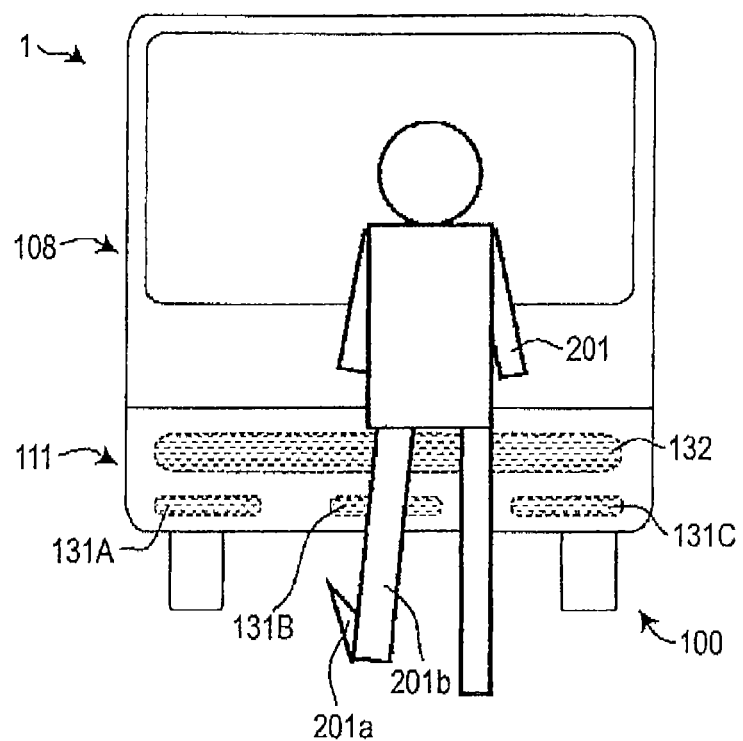
FIGS. 23A and 23B are conceptual views describing the usage of the vehicle door opening and closing apparatus according to the eighth embodiment of this disclosure.
Figure 23B:
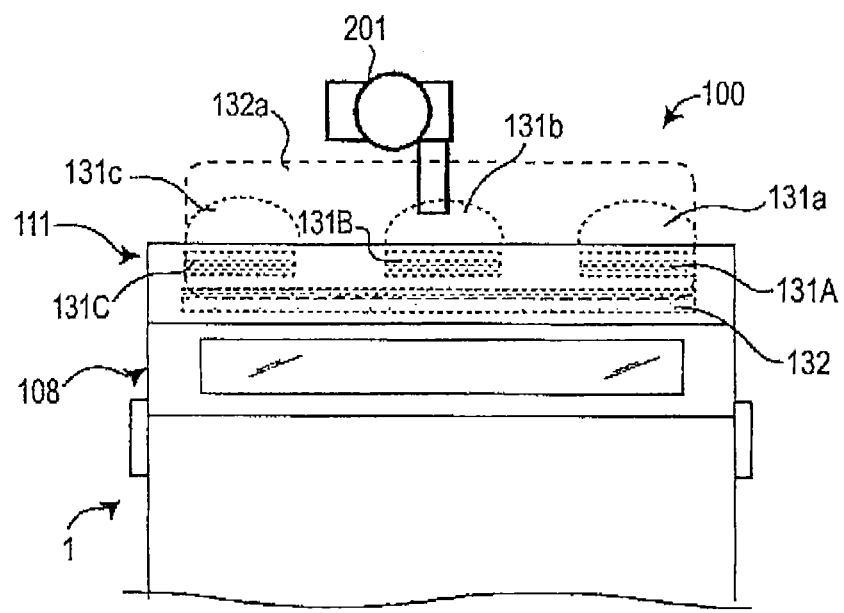
Figure 24:
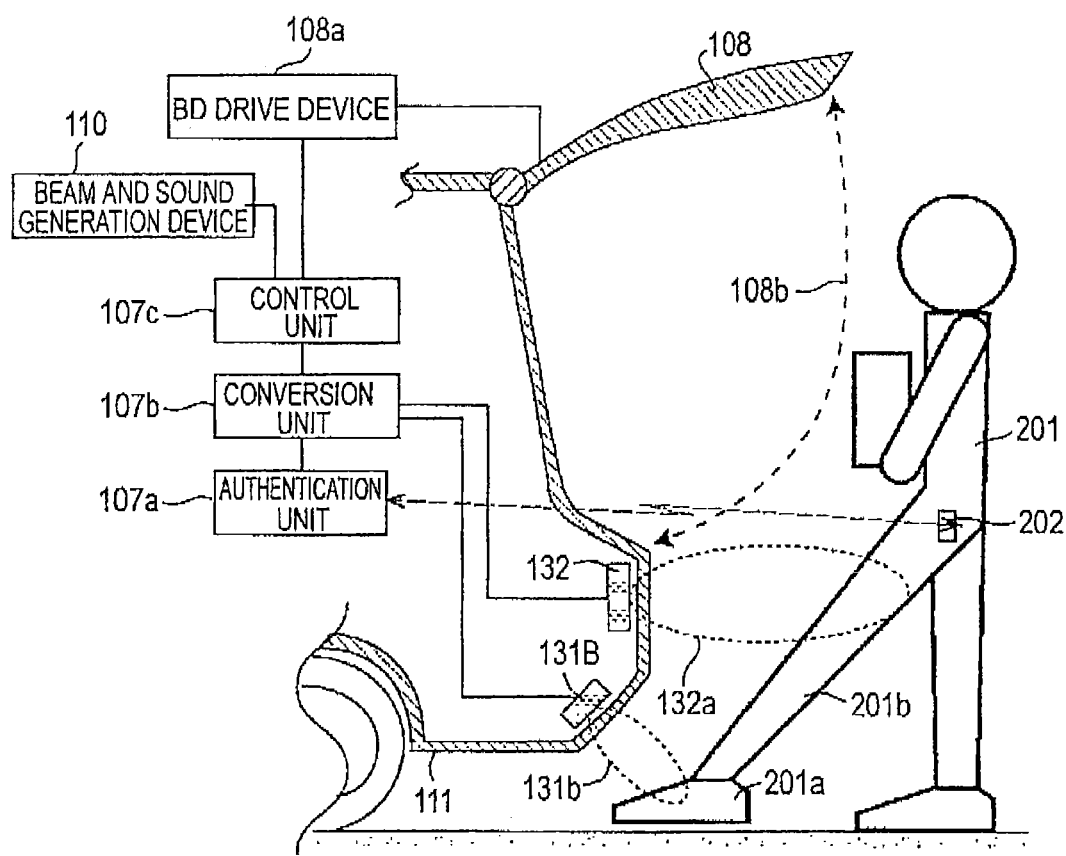
FIG. 24 is a conceptual view describing the usage of the vehicle door opening and closing apparatus according to the eighth embodiment of this disclosure.

FIG. 23A is a conceptual view of the vehicle 1 when seen from the back describing a relationship between the user 201 of the vehicle door opening and closing apparatus 100 and the sensors. FIG. 23B is a conceptual view of the vehicle 1 when seen from above describing a relationship between the user 201 and the respective sensing regions of the electrostatic sensors. FIG. 24 is a cross-sectional view taken along line XXIV-XXIV in FIG. 20 schematically illustrating as to how the user 201 uses the vehicle door opening and closing apparatus 100.

As illustrated in FIG. 23A, in the embodiment, when the user 201 puts the foot portion 201a toward one (for example, the center sensor unit 131B) of the sensor units of the lower stage electrostatic sensor 131, the center sensor unit 131B and the upper stage electrostatic sensor 132 detect the foot portion 201a of the user 201 and a body 201b (except for the foot portion) of the user, respectively. As a result, the back door 108 is opened or closed.

As illustrated in FIG. 23B, the sensor units 131A to 131C of the lower stage electrostatic sensor 131, and the upper stage electrostatic sensor 132 can be designed to have the respective sensing regions 131a to 131c, and 132a, each of which has substantially the same width as that of the electrostatic sensor. For this reason, the sensing regions 131a to 131c, and 132a are formed so as not to overlap each other.

As illustrated in FIG. 24, the sensing region 131b of the center sensor unit 131B of the lower stage electrostatic sensor 131 is oriented to the outside of the vehicle 1 at a predetermined angle with respect to the vertical direction. The respective sensing regions 131a and 131c of the left sensor unit 131A and the right sensor unit 131C of the lower stage electrostatic sensor 131 are oriented similar to the sensing region 131b. The lower stage electrostatic sensor 131 is mainly used so as to detect the foot portion 201a of the user 201, and to determine whether the user 201 has an intention of opening or closing the back door 108. There is no limitation to the maximum distance of the respective sensing regions 131a to 131c of the sensor units 131A to 131C of the lower stage electrostatic sensor 131, but each of the sensing regions 131a to 131c may have the maximum distance of 10 cm to 20 cm.

The sensing region 132a of the upper stage electrostatic sensor 132 is oriented to the outside of the vehicle 1, is formed above the sensing region of the lower stage electrostatic sensor 131, and is positioned at a height at which the upper stage electrostatic sensor 132 can detect the body 201b (the legs of the user in the example) of the user. When the user 201 puts the foot portion 201a in any one of the respective sensing regions of the sensor units of the lower stage electrostatic sensor 131, the upper stage electrostatic sensor 132 detects the body 201b of the user 201. For this reason, the upper stage electrostatic sensor 132 is used along with the lower stage electrostatic sensor 131 so as to determine whether the user 201 has an intention of opening or closing the back door 108. For this reason, it is possible to prevent an erroneous opening or closing operation of the back door 108 resulting from the detection of a small animal such as a dog, or an object such as a ball by the lower stage electrostatic sensor 131. There is no limitation to the maximum distance of the sensing region 132a of the upper stage sensor 132, but the sensing region 132a may have the maximum distance of 10 cm to 1 m.

A size and orientation of each of the respective sensing regions 131a to 131c of the sensor units 131A to 131C of the lower stage electrostatic sensor 131, and the sensing region 132a of the upper stage electrostatic sensor 132 may be designed based on the opening and closing trajectory 108b of the back door 108. Alternatively, the sizes and orientations of the sensing regions may be appropriately adjustable based on a preference of the user 201. Here, the opening and closing trajectory 108b of the back door 108 is a trajectory which is drawn by an end of the back door 108 when the back door 108 is opened and closed.

Operation

The operations of the configuration elements of the vehicle door opening and closing apparatus 100 according to the embodiment will be described. When the foot portion 201a of the user 201 is detected by one (for example, the center sensor unit 131B) of the sensor units of the lower stage electrostatic sensor 131, and the upper stage electrostatic sensor 132 detects the body 201b of the user 201, the vehicle door opening and closing apparatus 100 fully opens or closes the back door 108.

First, when the user 201 with the ID key 202 approaches a predetermined range of the vehicle 1, the authentication unit 107a of the control device 107 communicates with the ID key 202 via the antenna. The authentication unit 107a authenticates that the user 201 is a user of the vehicle 1 based on a signal from the ID key 202 (success of authentication). At this time, the control unit 107c outputs a control signal to the beam and sound generation device 110. The beam and sound generation device 110 may generate light or sound based on the control signal, and notify the user 201 that the authentication is successful. Upon the successful authentication by the authentication unit 107a, the vehicle door opening and closing apparatus 100 may operate.

The control unit 107c monitors the sensor units of the lower stage electrostatic sensor 131, and the upper stage electrostatic sensor 132, and confirms respective detection states of the electrostatic sensors. When the user 201 puts the foot portion 201a toward the sensing region 131b of one (here, the center sensor unit 131B of the sensor units of the lower stage electrostatic sensor 131, the center sensor unit 131B detects the foot portion 201a, and outputs a detection signal to the conversion unit 107B. At this time, a detecting operation of the center sensor unit 131B may start (be triggered), when the user 201 puts the foot portion 201a in the sensing region 131b for a few seconds, or the user 201 puts the foot portion 201a in and out of the sensing region 131b in multiple times. In this manner, it becomes apparently determined that the user 201 has an intention of opening or closing the door. The control unit 107c processes the detection signal converted by the conversion unit 107b, and outputs a drive signal for an opening drive or a closing drive to the BD drive apparatus 108a. The BD drive apparatus 108a performs an opening drive or a closing drive on the back door 108 based on the drive signal.

Figure 25A:
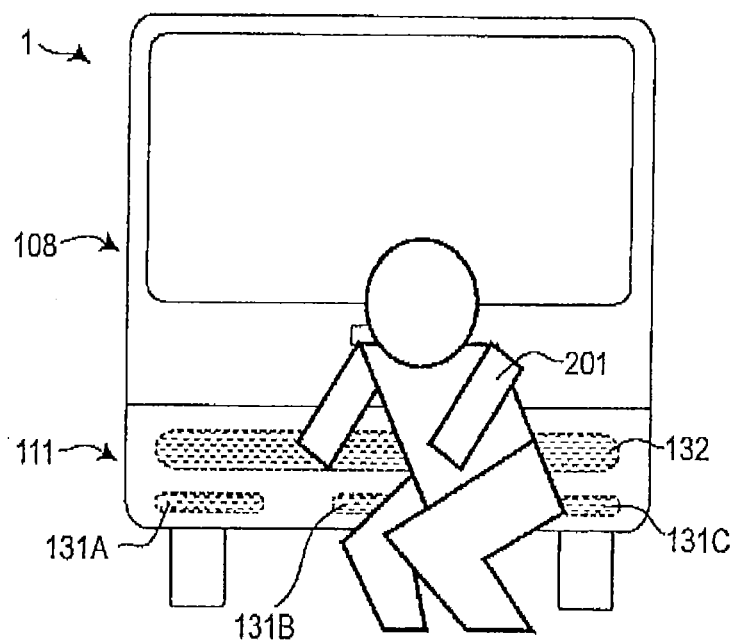
FIGS. 25A and 25B are conceptual views describing the usage of the vehicle door opening and closing apparatus according to the eighth embodiment of this disclosure.
Figure 25B:
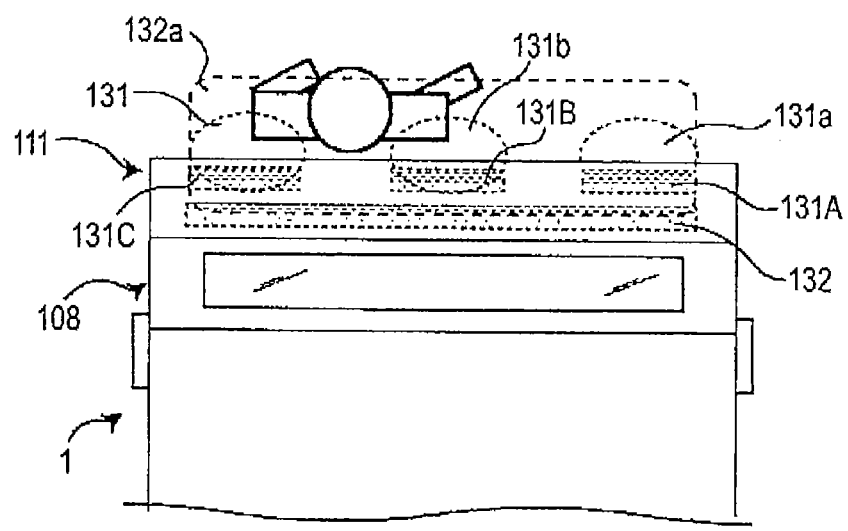

As illustrated in FIG. 25B, when the user 201 stands across the respective sensing regions of at least two sensor units (for example, the left sensor unit 131A and the center sensor unit 131B, or the center sensor unit 131B and the right sensor unit 131C) of the lower stage electrostatic sensor 131, the user 201 is detected by at least the two sensor units. For example, as illustrated in FIG. 25A, when the back door 108 is automatically opened or closed while the user 201 bends down in front of the back door 108, the back door 108 collides with the user 201, and the safety of the user 201 is not ensured. For this reason, when the user 201 is detected by at least the two sensor units of the lower stage electrostatic sensor 131, the control unit 107c does not start or stop an opening control or a closing control of the back door 108.

FIG. 26 is a flow chart describing controls performed by the control device 107 of the vehicle door opening and closing apparatus 100 according to the embodiment.

Step S901: the authentication unit 107a communicates with the ID key 202 via the antenna, and authenticates the user of the vehicle 1 based on a signal from the ID key 202 (success of authentication). When the back door 108 is open, the authentication step may be omitted.

Step S902: the control unit 107c monitors the lower state electrostatic sensor 131 and the upper stage electrostatic sensor 132, and confirms respective detection states of the sensor units 131A to 131C of the lower stage electrostatic sensor 131, and a detection state of the upper stage electrostatic sensor 132.

Step S903: the conversion unit 107b converts a detection signal from one (for example, the center sensor unit 131B) of the sensor units of the lower stage electrostatic sensor 131, and inputs the converted detection signal to the control unit 107c.

Step S904: the control unit 107c determines whether a detection signal is also input from the left sensor unit 131A, or the right sensor unit 131C of the lower stage electrostatic sensor 131. When the user 201 is detected by at least two sensor units (for example, the left sensor unit 131A and the center sensor unit 131B, or the center sensor unit 131B and the right sensor unit 131C) of the lower stage electrostatic sensor 131, the control unit 107c does not perform an opening control or a closing control on the back door 108 (YES in step S904). At this time, the control unit 107c may control the beam and sound generation device 110 to send an alarm to the user 201 via a sound. The operation of the vehicle door opening and closing apparatus 100 ends.

Step S905: the conversion unit 107b converts the detection signal from the upper stage electrostatic sensor 132, and inputs the converted detection signal to the control unit 107c. At this time, the control unit 107c may control the beam and sound generation device 110 to notify the user 201 that the user 201 is detected via a sound.

Step S906: the control unit 107c monitors the BD drive apparatus 108a, and determines whether the back door 108 is open or closed.

Step S907: when the back door 108 is closed, the control unit 107c outputs a drive signal to the BD drive apparatus 108a, and the BD drive apparatus 108a unlocks the back door 108 based on the drive signal.

Step S908: the control unit 107c outputs a drive signal to the BD drive apparatus 108a, and the BD drive apparatus 108a performs an opening drive on the back door 108 based on the drive signal. When at least two sensor units of the lower stage electrostatic sensor 131 detect the user 201 during the opening drive of the back door 108, the control unit 107c may output to the BD drive apparatus 108a a drive stop signal for stopping the opening drive of the back door 108, and the BD drive apparatus 108a may stop the opening drive of the back door 108 based on the drive stop signal.

Step S909: when the back door 108 is fully open, the operation of the vehicle door opening and closing apparatus 100 ends.

Step S910: when the back door 108 is open, the control unit 107c outputs a drive signal to the BD drive apparatus 108a, and the BD drive apparatus 108a performs a closing drive on the back door 108 based on the drive signal. When at least two sensor units of the lower stage electrostatic sensor 131 detect the user 201 during the closing drive of the back door 108, the control unit 107c may output to the BD drive apparatus 108a a drive stop signal for stopping the closing drive of the back door 108, and the BD drive apparatus 108a may stop the closing drive of the back door 108 based on the drive stop signal.

Step S911: when the closing drive of the back door 108 ends, the control unit 107c outputs a drive signal to the BD drive apparatus 108a, and the BD drive apparatus 108a locks the back door 108 based on the drive signal. The operation of the vehicle door opening and closing apparatus 100 ends.

A sequence of the above-mentioned steps can be appropriately changed depending on its purpose.

The vehicle door opening and closing apparatus according to the embodiment performs an opening drive or a closing drive on the back door when both the lower stage and upper stage electrostatic sensors detect the user, it is possible to prevent an erroneous opening or closing operation of the back door resulting from the detection of a small animal, an object, or the like by the lower stage electrostatic sensor. The vehicle door opening and closing apparatus according to the embodiment performs an opening drive or a closing drive on the back door when both the lower stage and upper stage electrostatic sensors detect the user, and thus it is possible to improve user-friendliness relative to the opening and closing of the back door. Furthermore, in the vehicle door opening and closing apparatus according to the embodiment, when the user is detected by at least two sensor units of the lower stage electrostatic sensor, the opening or closing of the vehicle door is not started or is stopped. Accordingly, it is possible to ensure the safety of the user.

Ninth Embodiment

A ninth embodiment of this disclosure relates to the vehicle door opening and closing apparatus in which the user is allowed to select a full opening or a half opening of the back door depending on the sensor unit of the lower stage electrostatic sensor selected to detect the foot portion of the user. Here, the "half opening of the door" indicates that the back door stops at a spot between a fully closed state and a fully open state.

With regard to the configuration elements of the vehicle door opening and closing apparatus 100, and the functions and operations of the configuration elements, the embodiment is the same as the eighth embodiment. The descriptions thereof will be omitted, and hereinafter, the feature points of the embodiment will be described.

Figure 27A:
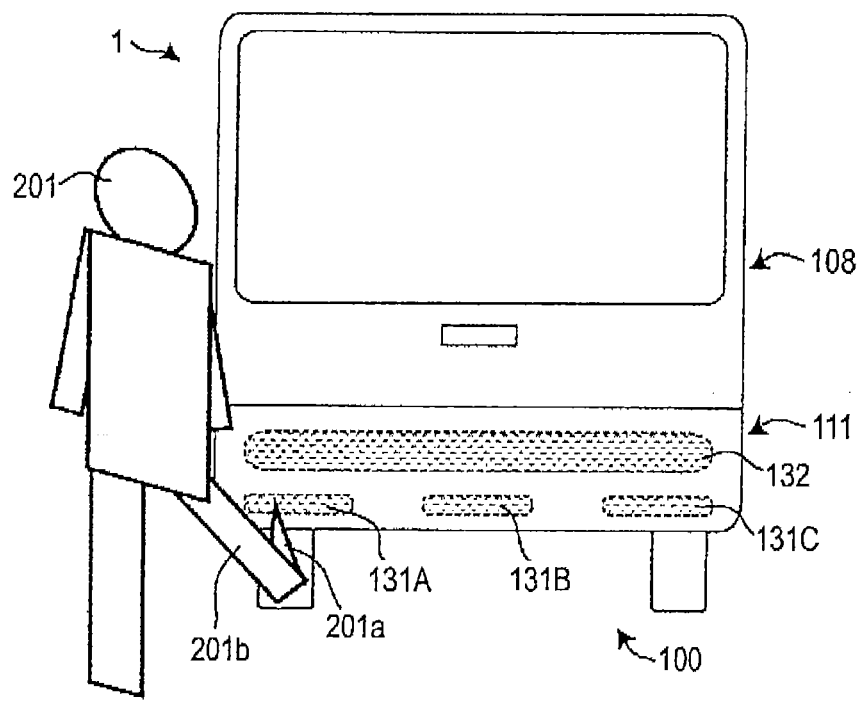
FIGS. 27A and 27B are conceptual views describing the usage of the vehicle door opening and closing apparatus according to a ninth embodiment of this disclosure.
Figure 27B:
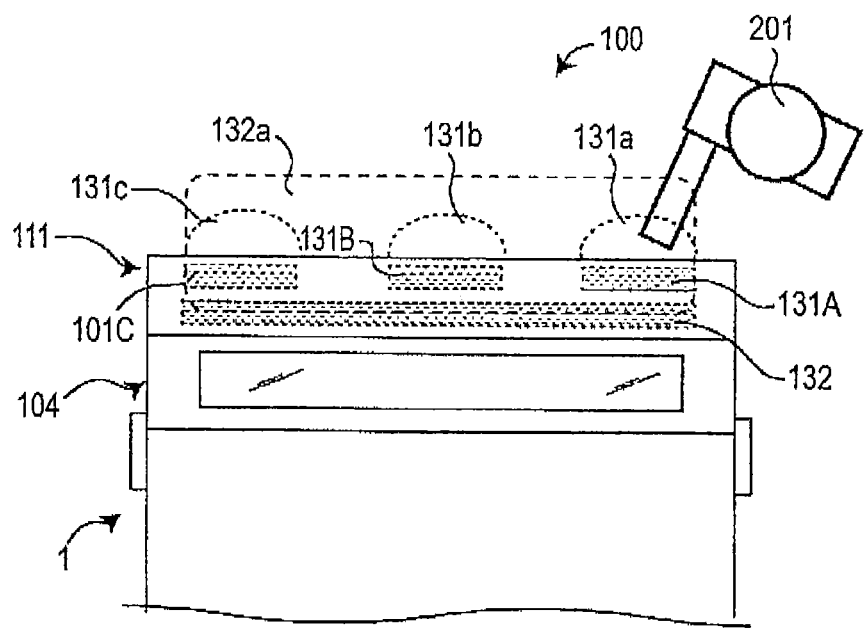
Figure 28:
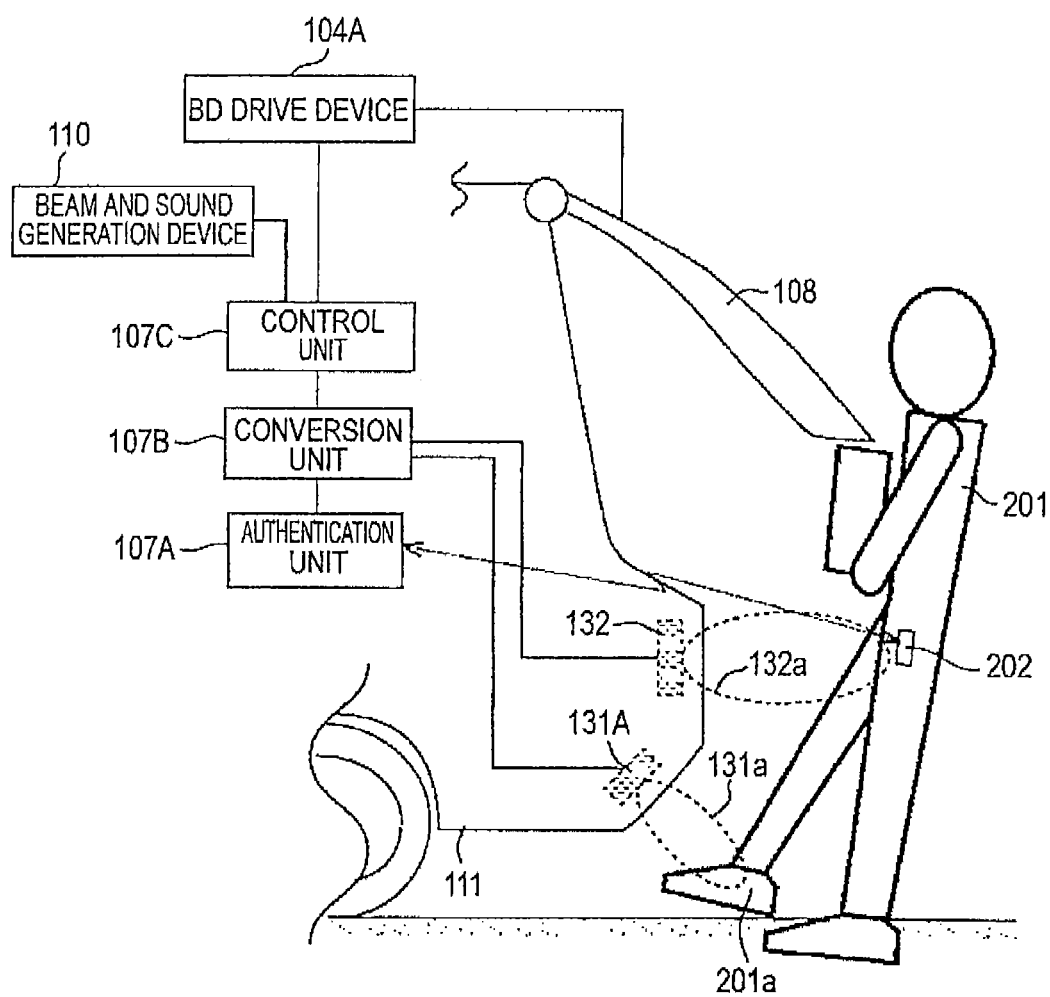
FIG. 28 is a conceptual view describing the usage of the vehicle door opening and closing apparatus according to the ninth embodiment of this disclosure.

FIG. 27A is a conceptual view describing as to how the user 201 standing diagonally back of the vehicle 1 uses the vehicle door opening and closing apparatus 100. FIG. 27B is a conceptual view of the vehicle 1 when seen from above describing a relationship between the user 201 and the respective sensing regions of the electrostatic sensors. FIG. 28 is a conceptual view of the vehicle 1 when seen from the side illustrating as to how the user 201 uses the vehicle door opening and closing apparatus 100.

Figure 29:
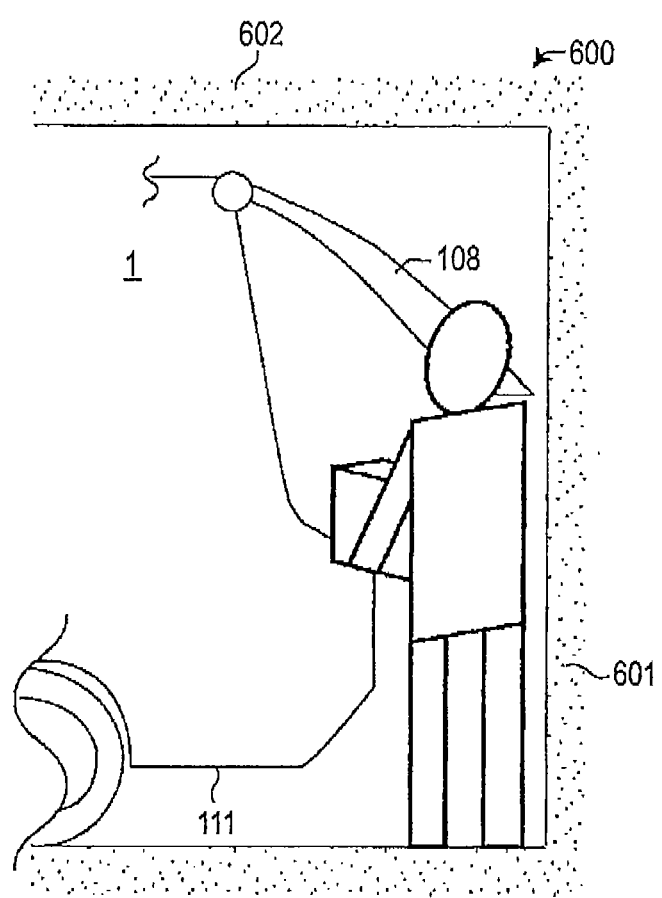
FIG. 29 is a conceptual view describing the usage of the vehicle door opening and closing apparatus according to the ninth embodiment of this disclosure.

In the embodiment, as illustrated in FIGS. 27A and 27B, when the foot portion 201a of the user 201 is detected by the left sensor unit 131A (or the right sensor unit 131C) of the lower stage electrostatic sensor 131 and the upper stage electrostatic sensor 132, the back door 108 is not fully opened, but half opened. For example, as illustrated in FIG. 29, in a state where a back portion of the vehicle 1 is proximate to a wall 601 of a garage 600, and the ceiling of the vehicle 1 is proximate to a ceiling 602 of the garage 600, when the back door 108 is fully opened, the back door 108 may collide with the wall 601 or the ceiling 602. At this time, in the vehicle door opening and closing apparatus 100 according to the embodiment, the user 201 can select the amount of opening of the back door 108 by selecting any one of the sensor units 131A to 131C of the lower stage electrostatic sensor 131. The amount of opening of the back door 108 may be set for each of the sensor units 131A to 131C in advance. Alternatively, the user 201 may arbitrarily set the amount of opening of the back door 108. For example, when the left sensor unit 131A is selected, the back door 108 may be opened one third of a fully opening. When the center sensor unit 131B is selected, the back door 108 may be fully opened. When the right sensor unit 131C is selected, the back door 108 may be half opened. When the back door 108 is half open, the user 201 may put the foot portion 201a toward the sensor unit again in order for the back door 108 to be fully opened.

Figure 30:
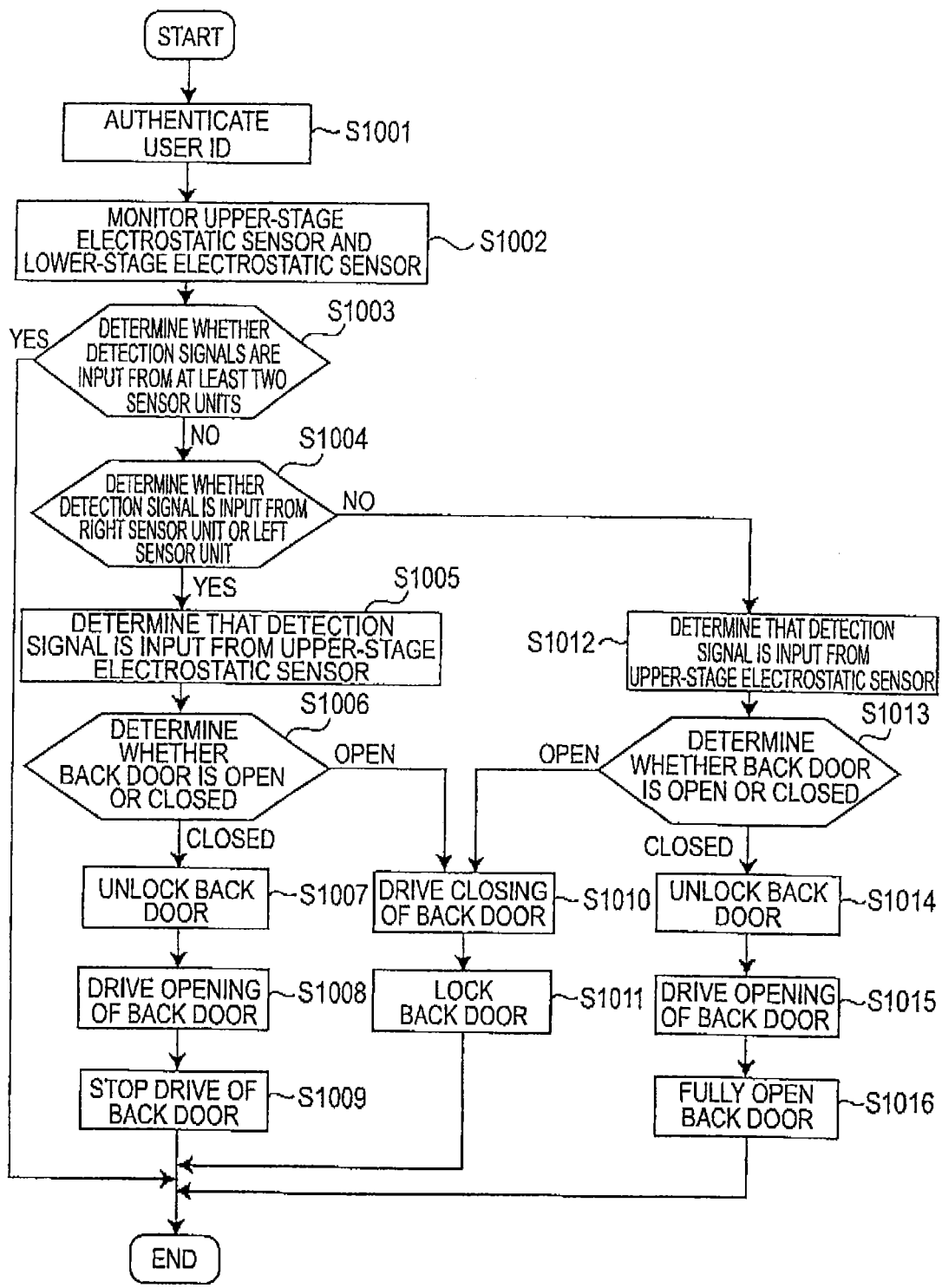
FIG. 30 is a control flow chart of the control device according to the ninth embodiment of this disclosure.

FIG. 30 is a flow chart describing controls performed by the control device 107 of the vehicle door opening and closing apparatus 100 according to the embodiment.

Step S1001: the authentication unit 107a communicates with the ID key 202 via the antenna, and authenticates the user of the vehicle 1 based on a signal from the ID key 202 (success of authentication). When the back door 108 is already open, the authentication step may be omitted.

Step S1002: the control unit 107c monitors the lower stage electrostatic sensor 131 and the upper stage electrostatic sensor 132, and confirms respective detection states of the sensor units 131A to 131C of the lower stage electrostatic sensor 131, and a detection state of the upper stage electrostatic sensor 132.

Step S1003: the control unit 107c determines whether detection signals are input from at least two sensor units of the lower stage electrostatic sensor 131. When the user 201 is detected by at least the two sensor units of the lower stage electrostatic sensor 131, the control unit 107c does not perform an opening control or a closing control on the back door 108 (YES in step S1003). At this time, the control unit 107c may control the beam and sound generation device 110 to send an alarm to the user 201 via a sound. The operation of the vehicle door opening and closing apparatus 100 ends.

Step S1004: the control unit 107c determines whether a detection signal is input from the left sensor unit 131A, or the right sensor unit 131C of the lower stage electrostatic sensor 131. When the detection signal is input from the left sensor unit 131A, or the right sensor unit 131C of the lower stage electrostatic sensor 131, the process proceeds to step S1005. Otherwise, that is, when a detection signal is input from the center sensor unit 131B, the process proceeds to step S1012.

Step S1005: the conversion unit 107b converts the detection signal from the upper stage electrostatic sensor 132, and inputs the converted detection signal to the control unit 107c. At this time, the control unit 107c may control the beam and sound generation device 110 to notify the user 201 that the user 201 is detected via a sound.

Step S1006: the control unit 107c monitors the BD drive apparatus 108a, and determines whether the back door 108 is open or closed.

Step S1007: when the back door 108 is closed, the control unit 107c outputs a drive signal to the BD drive apparatus 108a, and the BD drive apparatus 108a unlocks the back door 108 based on the drive signal.

Step S1008: the control unit 107c outputs a drive signal to the BD drive apparatus 108a, and the BD drive apparatus 108a performs an opening drive on the back door 108 based on the drive signal. When at least two sensor units of the lower stage electrostatic sensor 131 detect the user 201 during the opening drive of the back door 108, the control unit 107c may output to the BD drive apparatus 108a a drive stop signal for stopping the opening drive of the back door 108, and the BD drive apparatus 108a may stop the opening drive of the back door 108 based on the drive stop signal.

Step S1009: when the control unit 107c determines that the amount of opening of the back door 108 is the same as a set value (for example, half-opening) stored on the memory region or the like of the control device 107, the control unit 107c outputs a drive stop signal to the BD drive apparatus 108a, and the BD drive apparatus 108a stops the opening drive of the back door 108 based on the drive stop signal. The operation of the vehicle door opening and closing apparatus 100 ends.

Step S1010: when the back door 108 is open, the control unit 107c outputs a drive signal to the BD drive apparatus 108a, and the BD drive apparatus 108a performs a closing drive on the back door 108 based on the drive signal. When at least two sensor units of the lower stage electrostatic sensor 131 detect the user 201 during the closing drive of the back door 108, the control unit 107c may stop the closing drive of the back door 108.

Step S1011: when the closing drive of the back door 108 ends, the control unit 107c outputs a drive signal to the BD drive apparatus 108a, and the BD drive apparatus 108a locks the back door 108 based on the drive signal. The operation of the vehicle door opening and closing apparatus 100 ends.

Steps S1012 to 1015 are the same as steps S1005 to S1008, respectively and thus the descriptions thereof will be omitted.

Step S1016: when the back door 108 is fully opened, the operation of the vehicle door opening and closing apparatus 100 ends.

The vehicle door opening and closing apparatus according to the embodiment performs an opening drive or a closing drive on the back door when both the lower stage and upper stage electrostatic sensors detect the user, it is possible to prevent an erroneous opening or closing operation of the back door resulting from the detection of a small animal, an object, or the like by the lower stage electrostatic sensor. The vehicle door opening and closing apparatus according to the embodiment performs an opening drive or a closing drive on the back door when both the lower stage and upper stage electrostatic sensors detect the user, and thus it is possible to improve user-friendliness relative to the opening and closing of the back door. Furthermore, in the vehicle door opening and closing apparatus according to the embodiment, when the user is detected by at least two sensor units of the lower stage electrostatic sensor, the opening or closing of the vehicle door is not started or is stopped. Accordingly, it is possible to ensure the safety of the user. In the vehicle door opening and closing apparatus according to the embodiment, the user is allowed to select a full opening or a half opening of the back door depending on one of the sensor units of the lower stage electrostatic sensor selected to detect the foot portion of the user.

Tenth Embodiment

Figure 31A:
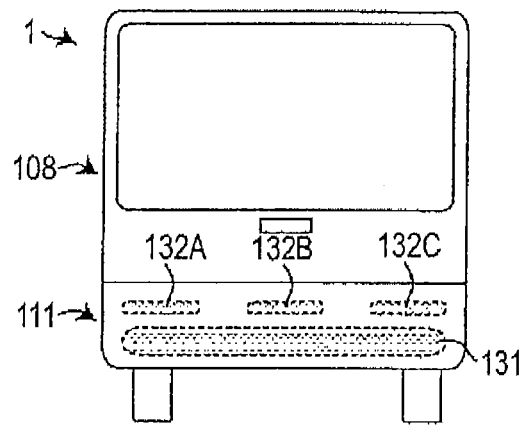
FIGS. 31A to 31C are schematic views of the vehicle according to a tenth embodiment of this disclosure.

A tenth embodiment of the disclosure will be described. As illustrated in FIG. 31A, in the vehicle door opening and closing apparatus, the lower stage electrostatic sensor 131 may have one sensor unit, and the upper stage electrostatic sensor 132 may have three sensor units (a left sensor unit 132A, a center sensor unit 132B, and a right sensor unit 132C). For example, when the user is detected by the left sensor unit 132A or the right sensor unit 132C of the upper stage electrostatic sensor 132, and by the lower stage electrostatic sensor 131, the back door 108 may be half opened. When the user is detected by the center sensor unit 132B of the upper stage electrostatic sensor 132, and the lower stage electrostatic sensor 131, the back door 108 may be fully opened.

Figure 31B:
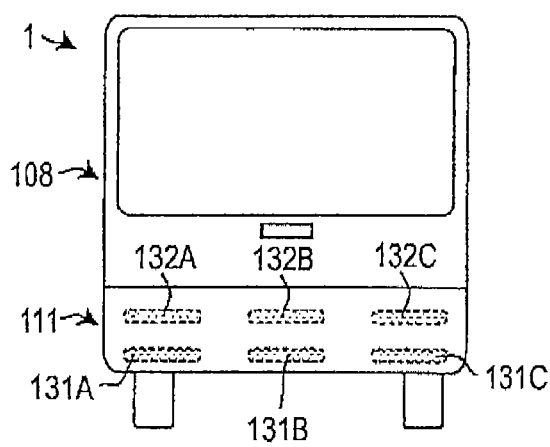

As illustrated in FIG. 31B, in the vehicle door opening and closing apparatus, the lower stage electrostatic sensor 131 may have the sensor units 131A to 131C, and the upper stage electrostatic sensor 132 may have the sensor units 132A to 132C. For example, when the user is detected by the center sensor unit 131B of the lower stage electrostatic sensor 131, and the center sensor unit 132B of the upper stage electrostatic sensor 132, the back door 108 may be opened or closed. In contrast, when the user is detected by the right sensor unit 131C (or the left sensor unit 131A) of the lower stage electrostatic sensor 131, and the center sensor unit 132B of the upper stage electrostatic sensor 132, the back door 108 may be not opened and closed.

Figure 31C:
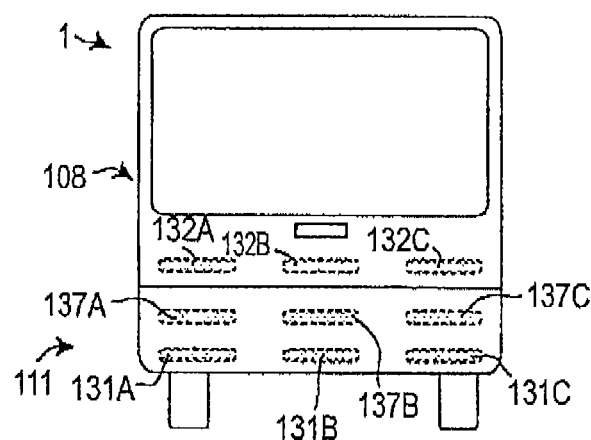

As illustrated in FIG. 31C, in the vehicle door opening and closing apparatus, the lower stage electrostatic sensor 131 may have the three sensor units 131A to 131C, and the upper stage electrostatic sensor 132 may have the three sensor units 132A to 132C. In addition, a middle electrostatic sensor 137 may be provided between the lower stage electrostatic sensor 131 and the upper stage electrostatic sensor 132, and have three sensor units 137A to 137C. For example, when the user is detected by the center sensor unit 131B of the lower stage electrostatic sensor 131, the center sensor unit 137B of the middle stage electrostatic sensor 137, and the center sensor unit 132B of the upper stage electrostatic sensor 132, the back door 108 may be opened or closed. In contrast, when the user is detected by the right sensor unit 131C of the lower stage electrostatic sensor 131, the center sensor unit 137B of the middle stage electrostatic sensor 137, and the center sensor unit 132B of the upper stage electrostatic sensor 132, the back door 108 may be not opened and closed.

Figure 32:
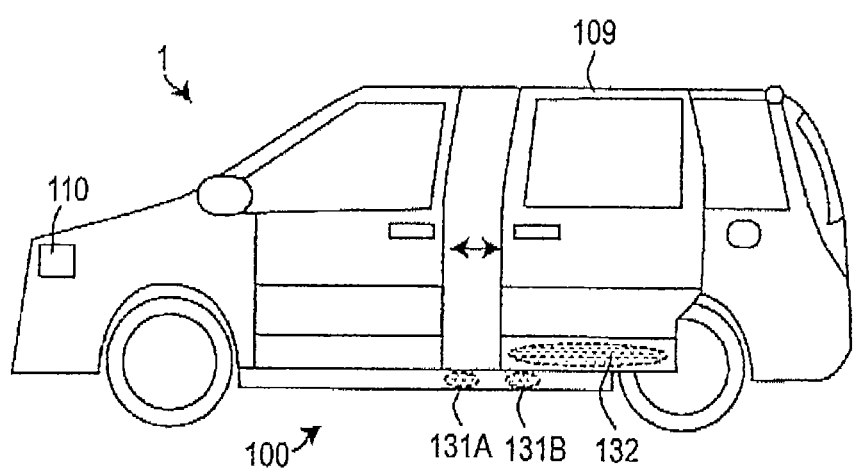
FIG. 32 is a schematic view of the vehicle according to the tenth embodiment of this disclosure.

Furthermore, as illustrated in FIG. 32, the lower stage electrostatic sensor 131 and the upper stage electrostatic sensor 132 may be provided in the sliding door (the side bumper, the sill cover, or the like) 109 of the vehicle 1. For example, when the user is detected by the left sensor unit 131A or the center sensor unit 131B of the lower stage electrostatic sensor 131, and the upper stage electrostatic sensor 132, the slide door 109 may be opened or closed.

An aspect of this disclosure is directed to a vehicle door opening and closing apparatus including a first detector that is installed in a vehicle, and detects a foot portion of a detection target in the vicinity of a door of the vehicle; a second detector that detects the detection target that stands in a predetermined range from the door of the vehicle; and a control unit that determines whether a drive signal for an opening drive or a closing drive of the door to a door drive apparatus by determining whether the detection target has an intention of opening or closing the door based on whether the detection signal indicative of detecting the foot portion is input from the first detector, by determining whether the door can be opened or closed based on the detection signal from the second detector, and based on determination results from the first and second detectors.

According to the aspect of this disclosure, it is determined whether the user has an intention of opening or closing the vehicle door based on input from a single sensor, and thus it is possible to improve user-friendliness relative to the opening and closing of the vehicle door. In addition, it can be determined whether the user does not stand in a predetermined range from the vehicle door, and the vehicle door can be opened or closed based on input from another sensor, and thus it is possible to ensure the safety of the user.

The vehicle door opening and closing apparatus according to the aspect of this disclosure may be configured such that the first detector is an electrostatic sensor, the second detector is an electrostatic sensor that is installed in a portion positioned above the first detector in a vertical direction, and that detects the body of the detection target except for the foot portion, and wherein when the detection signal is not input from the second detector, and the detection signal is input from the first detector, the control unit outputs the drive signal to the door drive apparatus.

The vehicle door opening and closing apparatus according to the aspect of this disclosure may be configured such that the first detector is installed in a rear bumper of the vehicle, and the second detector is installed in the rear bumper or a back door of the vehicle.

The vehicle door opening and closing apparatus according to the aspect of this disclosure may be configured such that the first detector is installed in a side bumper of the vehicle, and the second detector is installed in a sliding door of the vehicle.

The vehicle door opening and closing apparatus according to the aspect of this disclosure may be configured such that the first detector is provided at a predetermined angle with respect to the vertical direction so as to face the outside of the vehicle, and, when the detection target standing out of an opening and closing trajectory of the door puts the foot portion toward the first detector, the sizes, orientations and positions of respective sensing regions of the first and second detectors are adjusted in such a manner that the first detector detects the foot portion, and the second detector does not detect the body of the detection target.

The vehicle door opening and closing apparatus according to the aspect of this disclosure may be configured such that the first detector is an electrostatic sensor, the second detector is an optical sensor or a radio wave sensor that measures a distance between the second detector and the detection target, and that measures a speed of the detection target approaching the second detector, and, when the distance measured by the second detector is greater than or equal to a predetermined distance, the speed measured by the second detector is lower than or equal to a predetermined speed, and the detection signal is input from the first detector, the control unit outputs the drive signal to the door drive apparatus.

The vehicle door opening and closing apparatus according to the aspect of this disclosure may be configured such that the first detector is installed in the rear bumper or the side bumper of the vehicle, and the second detector is installed in an exterior portion of the rear bumper, the back door, or the sliding door of the vehicle.

The vehicle door opening and closing apparatus according to the aspect of this disclosure may be configured such that the predetermined speed is 1 m/s to 3 m/s.

The vehicle door opening and closing apparatus according to the aspect of this disclosure may be configured such that the first detector is an electrostatic sensor that has at least two detection units which are installed in the vehicle, being separated from each other, the second detector is an electrostatic sensor that is provided above the first detector so as to detect the body of the detection target except for the foot portion, and, when detection signals are respectively input from one of the detection units and from the second detector, the control unit outputs the drive signal to the door drive apparatus, and when detection signals are respectively input from two or more of the detection units, the control unit does not output the drive signal to the door drive apparatus.

The vehicle door opening and closing apparatus according to the aspect of this disclosure may be configured such that the first and second detectors are installed in the rear bumper of the vehicle.

The vehicle door opening and closing apparatus according to the aspect of this disclosure may be configured such that a first detection unit, which is one of the detection units, is installed in the rear bumper of the vehicle so as to be positioned at the center in a lateral direction of the vehicle, and a second detection unit, which is the other detection unit, is installed in the rear bumper so as to be positioned on a right side or a left side in the lateral direction of the vehicle, and, when detection signals are respectively input from the second detection unit and the second detector, the control unit outputs to the door drive apparatus a drive signal for half-opening the door.

The vehicle door opening and closing apparatus according to the aspect of this disclosure may be configured such that when detection signals are respectively input from the first detection unit and the second detector, the control unit outputs to the door drive apparatus a drive signal for fully opening the door.

The vehicle door opening and closing apparatus according to the aspect of this disclosure may be configured such that, when detection signals are respectively input from two more of the detection units during the opening drive or the closing drive of the door, the control unit outputs to the door drive apparatus a drive stop signal for stopping the opening drive or the closing drive.

The vehicle door opening and closing apparatus according to the aspect of this disclosure may be configured such that the apparatus further includes: an authentication unit that authenticates a user based on a signal from an ID key related to the vehicle, and that the vehicle door opening and closing apparatus is provided to operate upon the successful authentication by the authentication unit.

Another aspect of this disclosure is directed to a method of controlling a vehicle door opening and closing apparatus, including: a step of inputting a detection signal from a first detector that detects a foot portion of a detection target in the vicinity of a door of a vehicle; a step of inputting a detection signal from a second detector that detects the detection target that stands in a predetermined range; and a step of determining whether a drive signal for an opening drive or a closing drive of the door to a door drive apparatus by determining whether the detection target has an intention of opening or closing the door based on whether a detection signal indicative of detecting the foot portion is input from the first detector, by determining whether the door can be opened or closed based on the detection signal from the second detector, and based on determination results from the first and second detectors.

The method of controlling a vehicle door opening and closing apparatus according to the aspect of this disclosure may be configured such that the first detector is an electrostatic sensor, the second detector is an electrostatic sensor that is installed above the first detector in a vertical direction, and that detects the body of the detection target except for the foot portion, and, when the detection signal is not input from the second detector, and the detection signal is input from the first detector, the control unit outputs the drive signal to the door drive apparatus.

The method of controlling a vehicle door opening and closing apparatus according to the aspect of this disclosure may be configured such that the second detector is an optical sensor or a radio wave sensor that measures a distance between the second detector and the detection target, and that measures a speed of the detection target approaching the second detector, and, when the distance measured by the second detector is greater than or equal to a predetermined distance, the speed measured by the second detector is lower than or equal to a predetermined speed, and the detection signal is input from the first detector, the control unit outputs the drive signal to the door drive apparatus.

The method of controlling a vehicle door opening and closing apparatus according to the aspect of this disclosure may be configured such that the first detector is an electrostatic sensor that has at least two detection units which are installed in the vehicle, being separated from each other, the second detector is an electrostatic sensor that is provided above the first detector so as to detect the body of the detection target except for the foot portion, and, when detection signals are respectively input from one of the detection units and from the second detector, the control unit outputs the drive signal to the door drive apparatus, and when detection signals are respectively input from two or more of the detection units, the control unit does not output the drive signal to the door drive apparatus.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door opening and closing apparatus comprising:
    a first detector that is installed in a vehicle, and detects a foot portion of a detection target in a vicinity of a door of the vehicle;

a second detector that detects a body portion except the foot portion of the detection target that stands in a predetermined range from the door of the vehicle; and a control device that includes a control unit which outputs a drive signal for an opening drive or a closing drive of the door to a door drive apparatus, and the control device determines whether the detection target has an intention of opening or closing the door based on whether a detection signal indicative of detecting the foot portion is input from the first detector, determines whether the door is openable or closable without contacting the detection target based on the detection signal from the second detector, and determines whether the control unit outputs the drive signal for the opening drive or the closing drive of the door based on determination results from the first and second detectors.

2. The vehicle door opening and closing apparatus according to claim 1,
wherein the first detector is an electrostatic sensor,
wherein the second detector is an electrostatic sensor that is installed in a portion positioned above the first detector in a vertical direction, and
wherein when the detection signal is not input from the second detector, and the detection signal is input from the first detector, the control unit outputs the drive signal to the door drive apparatus.

3. The vehicle door opening and closing apparatus according to claim 2,
wherein the first detector is installed in a rear bumper of the vehicle, and
wherein the second detector is installed in the rear bumper or a back door of the vehicle.

4. The vehicle door opening and closing apparatus according to claim 1,
wherein the first detector is installed in a side bumper of the vehicle, and
wherein the second detector is installed in a sliding door of the vehicle.

5. The vehicle door opening and closing apparatus according to claim 1,
wherein the first detector is provided at a predetermined angle with respect to the vertical direction so as to face an outside of the vehicle, and
wherein when the detection target standing out of an opening and closing trajectory of the door puts the foot portion toward the first detector, sizes, orientations and positions of respective sensing regions of the first and second detectors are adjusted in such a manner that the first detector detects the foot portion, and the second detector does not detect a body of the detection target.

6. The vehicle door opening and closing apparatus according to claim 1,
wherein the first detector is an electrostatic sensor,
wherein the second detector is an optical sensor or a radio wave sensor that measures a distance between the second detector and the detection target, and that measures a speed of the detection target approaching the second detector, and
wherein when the distance measured by the second detector is greater than or equal to a predetermined distance, the speed measured by the second detector is lower than or equal to a predetermined speed, and a detection signal is input from the first detector, the control unit outputs the drive signal to the door drive apparatus.

7. The vehicle door opening and closing apparatus according to claim 6,
wherein the first detector is installed in a rear bumper or a side bumper of the vehicle, and wherein the second detector is installed in an exterior portion of the rear bumper, the back door, or the sliding door of the vehicle.

8. The vehicle door opening and closing apparatus according to claim 6,
wherein the predetermined speed is 1 m/s to 3 m/s.

9. The vehicle door opening and closing apparatus according to claim 1,
wherein the first detector is an electrostatic sensor that has at least two detection units which are installed in the vehicle, being separated from each other,
wherein the second detector is an electrostatic sensor that is provided above the first detector so as to detect the body portion except the foot portion of the detection target, and
wherein when detection signals are respectively input from one of the detection units and from the second detector, the control unit outputs the drive signal to the door drive apparatus, and when detection signals are respectively input from two or more of the detection units, the control unit does not output the drive signal to the door drive apparatus.

10. The vehicle door opening and closing apparatus according to claim 9,
wherein the first and second detectors are installed in a rear bumper of the vehicle.

11. The vehicle door opening and closing apparatus according to claim 9,
wherein a first detection unit, which is one of the detection units, is installed in the rear bumper of the vehicle so as to be positioned at a center in a lateral direction of the vehicle, and a second detection unit, which is the other detection unit, is installed in the rear bumper so as to be positioned on a right side or a left side in the lateral direction of the vehicle, and
wherein when detection signals are respectively input from the second detection unit and the second detector, the control unit outputs to the door drive apparatus a drive signal for half-opening the door.

12. The vehicle door opening and closing apparatus according to claim 11,
wherein when detection signals are respectively input from the first detection unit and the second detector, the control unit outputs to the door drive apparatus a drive signal for fully opening the door.

13. The vehicle door opening and closing apparatus according to claim 9,
wherein when detection signals are respectively input from two more of the detection units during the opening drive or the closing drive of the door, the control unit outputs to the door drive apparatus a drive stop signal for stopping the opening drive or the closing drive.

14. The vehicle door opening and closing apparatus according to claim 1, the apparatus further comprising:
an authentication unit that authenticates a user based on a signal from an ID key related to the vehicle,
wherein the vehicle door opening and closing apparatus is provided to operate upon a successful authentication by the authentication unit.

15. A method of controlling a vehicle door opening and closing apparatus, the method comprising:
inputting a detection signal from a first detector that detects a foot portion of a detection target in a vicinity of a door of a vehicle;
inputting a detection signal from a second detector that detects a body portion except the foot portion of the detection target that stands in a predetermined range; and determining whether a drive signal for an opening drive or a closing drive of the door to a door drive apparatus by determining whether the detection target has an intention of opening or closing the door based on whether a detection signal indicative of detecting the foot portion is input from the first detector, by determining whether the door is openable or closable without contacting the detection target based on the detection signal from the second detector, and based on determination results from the first and second detectors.

16. The method of controlling a vehicle door opening and closing apparatus according to claim 15,
   wherein the first detector is an electrostatic sensor,
   wherein the second detector is an electrostatic sensor that is installed above the first detector in a vertical direction, and
   wherein when the detection signal is not input from the second detector, and the detection signal is input from the first detector, the control unit outputs the drive signal to the door drive apparatus.

17. The method of controlling a vehicle door opening and closing apparatus according to claim 15,
   wherein the second detector is an optical sensor or a radio wave sensor that measures a distance between the second detector and the detection target, and that measures a speed of the detection target approaching the second detector, and
   wherein when the distance measured by the second detector is greater than or equal to a predetermined distance, the speed measured by the second detector is lower than or equal to a predetermined speed, and the detection signal is input from the first detector, the control unit outputs the drive signal to the door drive apparatus.

18. The method of controlling a vehicle door opening and closing apparatus according to claim 15,
   wherein the first detector is an electrostatic sensor that has at least two detection units which are installed in the vehicle, being separated from each other,
   wherein the second detector is an electrostatic sensor that is provided above the first detector so as to detect the body except the foot portion of the detection target, and
   wherein when detection signals are respectively input from one of the detection units and from the second detector, the control unit outputs the drive signal to the door drive apparatus, and when detection signals are respectively input from two or more of the detection units, the control unit does not output the drive signal to the door drive apparatus.

* * * * *